United States Patent
Peng et al.

(10) Patent No.: US 12,517,268 B2
(45) Date of Patent: Jan. 6, 2026

(54) MOBILE REAL TIME KINEMATIC (RTK) / PRECISE POINT POSITIONING (PPP) ENHANCEMENT WITH ANTENNA PCO/PCV COMPENSATION

(71) Applicant: QUALCOMM Incorporated, San Diego, CA (US)

(72) Inventors: Yuxiang Peng, Sunnyvale, CA (US); Ning Luo, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 18/334,270

(22) Filed: Jun. 13, 2023

(65) Prior Publication Data

US 2024/0418871 A1    Dec. 19, 2024

(51) Int. Cl.
*G01S 19/48* (2010.01)
*H04W 4/029* (2018.01)

(52) U.S. Cl.
CPC ............. *G01S 19/48* (2013.01); *H04W 4/029* (2018.02)

(58) Field of Classification Search
CPC ......... G01S 19/48; G01S 19/36; H04W 4/029
See application file for complete search history.

(56) References Cited

U.S. PATENT DOCUMENTS

| | | | | |
|---|---|---|---|---|
| 2010/0141513 A1* | 6/2010 | Lawrence | ............... | G01S 19/33 |
| | | | | 342/357.31 |
| 2023/0043489 A1* | 2/2023 | Angelo | .................... | G01S 19/04 |

OTHER PUBLICATIONS

T. Michel et al. "On Attitude Estimation with Smartphones," (2017) IEEE International Conference on Pervasive Computing and Communications (PerCom), pp. 1-2 and 4-5 (Year: 2017).*
Kunysz W., "Antenna Phase Center Effects and Measurements in GNSS Ranging Applications", In 2010 14th International Symposium on Antenna Technology and Applied Electromagnetics & the American Electromagnetics Conference, IEEE, Jul. 5-8, 2010, 4 pages.
Vitus M., "Carrier Phase Techniques", Aug. 30, 2005, 14 pages, Stanford University Computer Science, https://cs.stanford.edu/~woodward/papers/cp_dgps.pdf., 14 pages.

* cited by examiner

*Primary Examiner* — Brandon J Miller
(74) *Attorney, Agent, or Firm* — QUALCOMM Incorporated

(57) ABSTRACT

Techniques for global navigation satellite system (GNSS)-based positioning of a mobile device based on antenna phase center compensation are disclosed. The techniques can include determining a phase center profile of a receiver antenna of the mobile device that is placed in a fixed-frame condition and executing an antenna phase center compensation procedure upon detecting placement of the mobile device in a non-fixed frame condition. The antenna phase center compensation procedure can include obtaining attitude information of the mobile device based at least in part on sensor data obtained from one or more sensors of the mobile device, and incorporating the attitude information of the mobile device into the phase center profile of the receiver antenna of the mobile device. A global navigation satellite system-based positioning operation may be executed that includes antenna phase center compensation based at least in part on incorporating the attitude information into the phase center profile.

30 Claims, 9 Drawing Sheets

MOBILE REAL TIME KINEMATIC (RTK) / PRECISE POINT POSITIONING (PPP) ENHANCEMENT WITH ANTENNA PCO/PCV COMPENSATION

BACKGROUND

1. Field of Disclosure

The present disclosure relates generally to the field of satellite-based positioning, and more specifically to enhancing satellite-based positioning information based on compensating for phase center offset and phase center variation.

2. Description of Related Art

Global Navigation Satellite Systems (GNSS) can provide accurate positioning information of a mobile device that includes a GNSS receiver such as, for example, a smartphone, an unmanned aerial vehicle (UAV), or a navigation aid. Traditional GNSS positioning provides an accuracy on the order of a few meters, and more precise GNSS-based techniques such as, for example, Precise Point Positioning (PPP) and Real Time Kinematic (RTK) can provide more precision. Both PPP and RTK use additional correction information to achieve higher precision than traditional GNSS positioning. However, this additional correction information may not always take into consideration certain factors associated with operating environments and physical features of mobile devices.

BRIEF SUMMARY

An example method of global navigation satellite system (GNSS)-based positioning of a mobile device based on antenna phase center compensation can include determining a first phase center profile of a first receiver antenna of the mobile device that is placed in a fixed-frame condition and executing an antenna phase center compensation procedure upon detecting placement of the mobile device in a non-fixed frame condition. The antenna phase center compensation procedure can include obtaining attitude information of the mobile device based at least in part on sensor data obtained from one or more sensors of the mobile device, and incorporating the attitude information of the mobile device into the first phase center profile of the first receiver antenna of the mobile device. The method can further include executing a first global navigation satellite system-based positioning operation that includes antenna phase center compensation based at least in part on incorporating the attitude information of the mobile device into the first phase center profile of the first receiver antenna of the mobile device.

An example apparatus for global navigation satellite system (GNSS)-based positioning of a mobile device based on antenna phase center compensation can include a global navigation satellite system (GNSS) receiver that includes at least a first receiver antenna, a memory, and one or more processors communicatively coupled with the GNSS receiver and the memory. The one or more processors are configured to determine a first phase center profile of the first receiver antenna of the mobile device that is placed in a fixed-frame condition, and execute an antenna phase center compensation procedure upon detecting placement of the mobile device in a non-fixed frame condition. The antenna phase center compensation procedure can include obtaining attitude information of the mobile device based at least in part on sensor data obtained from one or more sensors of the mobile device, and incorporating the attitude information of the mobile device into the first phase center profile of the first receiver antenna of the mobile device. The one or more processors are further configured to execute a first global navigation satellite system-based positioning operation that includes antenna phase center compensation based at least in part on incorporating the attitude information of the mobile device into the first phase center profile of the first receiver antenna of the mobile device.

An example non-transitory computer-readable medium storing instructions for global navigation satellite system (GNSS)-based positioning of a mobile device based on antenna phase center compensation, the instructions comprising code for determining a first phase center profile of a first receiver antenna of the mobile device that is placed in a fixed-frame condition, and executing an antenna phase center compensation procedure upon detecting placement of the mobile device in a non-fixed frame condition. The antenna phase center compensation procedure can include obtaining attitude information of the mobile device based at least in part on sensor data obtained from one or more sensors of the mobile device, and incorporating the attitude information of the mobile device into the first phase center profile of the first receiver antenna of the mobile device. The instructions can further include code for executing a first global navigation satellite system-based positioning operation that includes antenna phase center compensation based at least in part on incorporating the attitude information of the mobile device into the first phase center profile of the first receiver antenna of the mobile device.

An example apparatus for global navigation satellite system (GNSS)-based positioning of a mobile device based on antenna phase center compensation, the apparatus comprising means for determining a first phase center profile of a first receiver antenna of the mobile device that is placed in a fixed-frame condition and means for executing an antenna phase center compensation procedure upon detecting placement of the mobile device in a non-fixed frame condition. The antenna phase center compensation procedure can include obtaining attitude information of the mobile device based at least in part on sensor data obtained from one or more sensors of the mobile device, and incorporating the attitude information of the mobile device into the first phase center profile of the first receiver antenna of the mobile device. The apparatus can further include means for executing a first global navigation satellite system-based positioning operation that includes antenna phase center compensation based at least in part on incorporating the attitude information of the mobile device into the first phase center profile of the first receiver antenna of the mobile device.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

The detailed description below pertains to a few example embodiments that are illustrated in the accompanying drawings. However, it must be understood that the description is equally relevant to various other variations of the embodiments described herein. Such embodiments may utilize objects and/or components other than those illustrated in the drawings. It must also be understood that like reference numerals used in the various figures indicate similar or identical objects.

DETAILED DESCRIPTION

Figure 1:
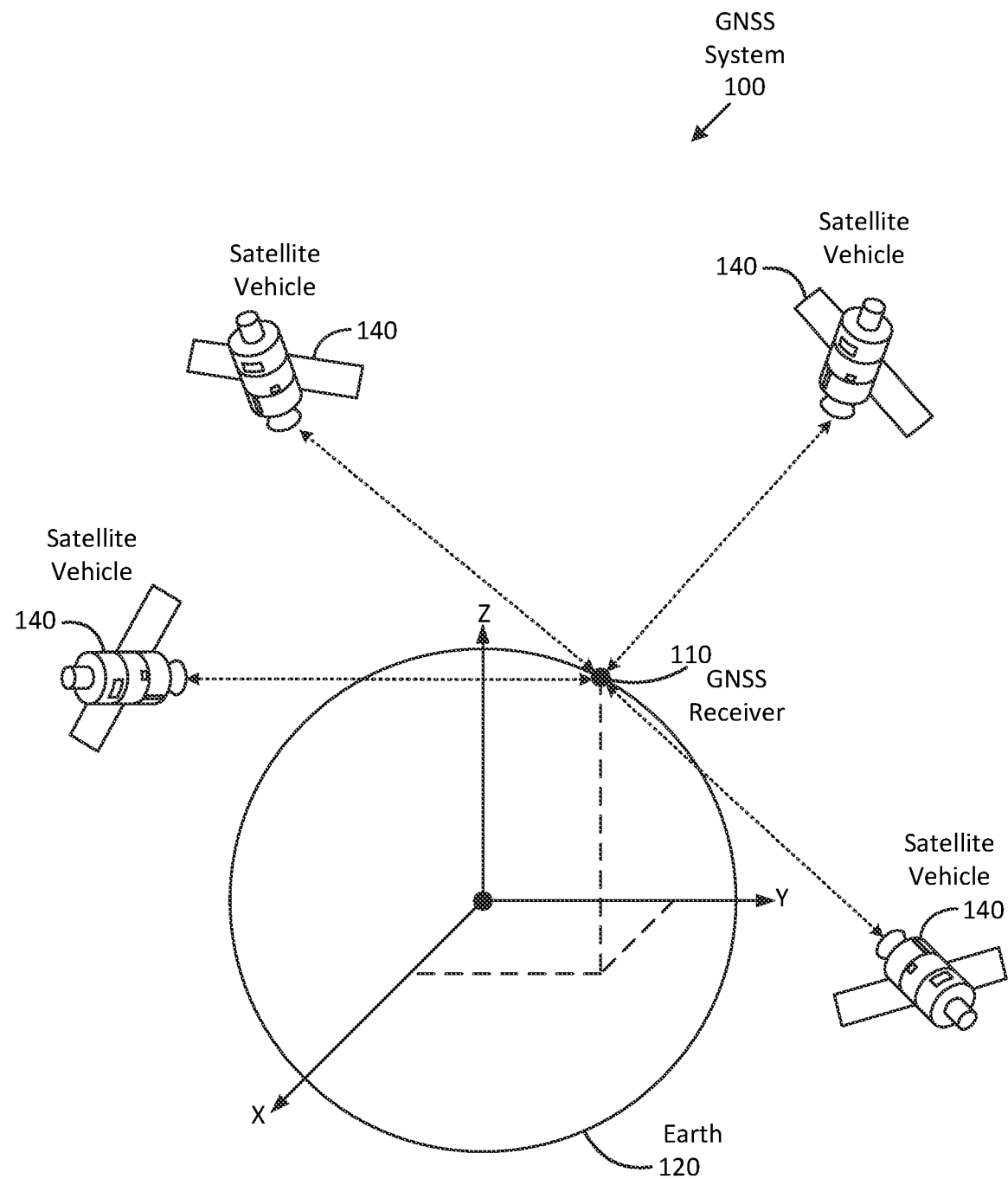
FIG. 1 is a simplified diagram of a GNSS system, according to an embodiment.

Several illustrative examples will now be described with respect to the accompanying drawings, which form a part hereof. While particular examples, in which one or more aspects of the disclosure may be implemented, are described below, other examples may be used, and various modifications may be made without departing from the scope of the disclosure or the spirit of the appended claims.

Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, particular features, structures, or characteristics described herein may be combined in one or more examples.

The methodologies described herein may be implemented by various means depending upon applications according to particular examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

As used herein, the phrase "mobile device" is not intended to be exclusive or limited to any specific implementation described herein, unless otherwise noted. In general, a mobile device may be any portable device that can be moved, or can move, from one place to another, either independently or when carried by a person. A few non-exhaustive examples can include a smartphone, a mobile phone, a tablet computer, a laptop computer, a tracking device, and a wearable device (e.g., smartwatch, glasses, Augmented Reality (AR)/Virtual Reality (VR) headset, etc.), an automobile, a water-borne vessel, an aircraft, a motorcycle, and an Internet of Things (IoT) device.

The phrase "space vehicle" (SV) or "satellites" as referred to herein, relates to an object that is capable of transmitting signals to receivers on the earth's surface. In one particular example, such an SV may be a geostationary satellite. Alternatively, an SV may be a satellite traveling in an orbit and moving relative to a stationary position on the earth. However, these are merely examples of SVs and claimed subject matter is not limited in these respects.

As described herein, a GNSS receiver may comprise and/or be incorporated into an electronic device and as described herein, an estimate of a location of the Global Positioning System (GPS) receiver may be referred to as a location, a location estimate, a location fix, a fix, a position, a position estimate or a position fix. In some cases, a location may be described in a geodetic format, thus providing location coordinates for the GPS receiver (e.g., latitude and longitude) which may or may not include an altitude component (e.g., height above sea level, height above or depth below ground level, floor level or basement level).

As indicated above, traditional GNSS positioning provides an accuracy on the order of a few meters, and more precise GNSS-based techniques such as Real Time Kinematic (RTK) and Precise Point Positioning (PPP) can provide sub-meter accuracy. Both techniques use additional correction information to achieve the higher level of accuracy. However, traditional correction information may not take into consideration certain factors associated with operating environments and physical features of mobile devices. Accordingly, as described herein, RTK and PPP positioning techniques can be enhanced by taking into consideration certain characteristics of one or more antennas that may be collocated in a mobile device and configured to receive one or more types of GNSS signals. In an example embodiment, antenna parameters such as Phase Center Variation (PCV) and/or Phase Center Offset (PCO) are used to enhance position information derived from GNSS signals.

A phase center of an antenna as defined by IEEE standards is "the location of a point associated with an antenna such that, if taken as the center of a sphere whose radius extends into the far-field, the phase of a given field component over the surface of the radiation sphere is "essentially" constant, at least over the portion of the surface where the radiation is significant." In practice, the phase characteristic of an antenna is not purely spherical, and deviations from this idealized shape can contribute to PCV and PCO.

Furthermore, each of various types of antennas provided in each of various types of devices in each of various operating environments can have unique PCV and PCO parameters. For example, the PCO and/or PCV parameters of a large antenna having a configuration that includes a large ground plane and a stable phase center can be different than the PCV and/or PCO parameters of an antenna that is a part of a small device, particularly a mobile device, such as, for example a smartphone, where an antenna may be provided on the basis of considerations such as compactness and cost.

Furthermore, a smartphone may have more than one antenna, and the PCV and PCO parameters of the multiple antennas can differ with respect to one another. For example, a first antenna may be configured to receive a first type of GNSS signal that is known in the art as an L1 signal (1575.42 MHz) and a second antenna may be configured to receive a second type of GNSS signal that is known in the art as an L5 signal (1176.45 MHz). The PCV and PCO parameters of the two antennas may differ with respect to one another not only when the smartphone is in a motionless condition (laid flat on a table, for example) but may further differ with respect to one another when the smartphone is moved around. One factor that can contribute to a change in PCV and/or PCV is an attitude of the smartphone. The attitude of the smartphone pertains to an orientation of the device with respect to a fixed reference frame. The orientation may also be described in terms of a direction, and can be represented in real world coordinates or can be represented mathematically in different ways such as, for example, in the form of a rotation matrix or in the form of three separate values for yaw, pitch, and roll.

An example position location operation conducted by use of the smartphone can involve receiving one or more GNSS signals from one or more GNSS satellites and determining, in accordance with disclosure, the position of the smartphone based on evaluating a combination of information contained in these signals and refining the information by use of additional parameters such as, for example, the PCV and/or PCV of one or more antennas used for receiving the GNSS signal(s).

Refining position information received in a device by use of PCV and/or POV of one or more antennas of the device is fairly challenging when the device is either mounted on a fixture (such as, for example, a surveyor tripod) or is a mobile device. The procedure becomes even more challenging when the position information is received and evaluated in a small mobile device such as, for example, a smartphone, where various factors come into play that may not be applicable in other devices (including the device mounted on a tripod). Some example factors can include a variable attitude of the smartphone (the smartphone can be oriented in any of various directions at any of various times), variable relative positioning of two or more antennas of the smartphone (such as, for example, when a flip-type smartphone is opened partially at a first moment in time and opened fully at another moment in time), different operating frequencies and bandwidths of the two or more antennas (a first antenna may operate at L1 GNSS frequency and a second antenna may operate at L5 GNSS frequency, for example), variable operating environment of the smartphone (in a pocket at a first moment in time, nestled in a palm at a second moment in time, pressed against a cheek at a third moment in time, inside a mall at a fourth moment in time, inside a vehicle at a fifth instant in time, in an open air stadium at a sixth instant in time, etc.), and physical characteristics of the antennas (compact size, layout on a printed circuit board, cost considerations, etc.).

Various aspects of the disclosure generally relate to improving the accuracy of position measurements carried out by use of a mobile device such as a smartphone. An example method to do so can include placing the mobile device in a fixed-frame condition and determining a phase center profile of an antenna of the mobile device. Attitude information of the mobile device may then be determined when the mobile device is placed in a non-fixed frame condition for purposes of executing a GNSS-based measurement (such as RTK and PPP). The accuracy of a position measurement obtained by use of the mobile device placed in the non-fixed frame condition may be enhanced by carrying out an antenna phase center compensation procedure that can include incorporating the attitude information into the phase center profile of the antenna. Incorporating the attitude information into the phase center profile of the antenna can include determining a rotation matrix based on the attitude information of the mobile device and aligning a frame of the mobile device to an earth-centered, earth-fixed (ECEF) frame based on applying the rotation matrix to the phase center profile.

Particular aspects of the subject matter described in this disclosure can be implemented to realize one or more of the potential advantages such as, for example, improving a traditional level of accuracy obtained in GNSS-based position measurements carried out by use of a phone. As described above, an antenna of a phone suffers from certain limitations in comparison to an antenna of a larger device, when used for carrying out GNSS-based position measurements. Compensating for measurement errors, particularly, errors introduced due to phase center variation (PCV) and phase center offset (PCO) characteristics of one or more antennas of a mobile device has hitherto been unaddressed.

FIG. 1 is a simplified diagram of a GNSS system 100, provided to illustrate how GNSS is generally used to determine an accurate location of a GNSS receiver 110 on earth 120. Put generally, the GNSS system 100 enables an accurate GNSS position fix of the GNSS receiver 110, which receives RF signals from GNSS satellites 140 from one or more GNSS constellations. The types of GNSS receiver 110 used may vary, depending on application. In some embodiments, for instance, the GNSS receiver 110 may comprise a standalone device or component incorporated into another device (e.g., a mobile device). Some examples of a standalone device may include a smartphone, an unmanned aerial vehicle (UAV), a laptop computer, and a navigation aid. In some embodiments, the GNSS receiver 110 may be integrated into industrial or commercial equipment, such as survey equipment, Internet of Things (IoT) devices, etc.

It will be understood that the diagram provided in FIG. 1 is greatly simplified. In practice, there may be dozens of satellites 140 and a given GNSS constellation, and there are many different types of GNSS systems. Some examples of GNSS systems include GPS, Galileo, GLONASS, or BDS. Additional GNSS systems include, for example, Quasi-Zenith Satellite System (QZSS) over Japan, Indian Regional Navigational Satellite System (IRNSS) over India, etc. In addition to the basic positioning functionality later described, GNSS augmentation (e.g., a Satellite Based Augmentation System (SBAS)) may be used to provide higher accuracy. Such augmentation may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

GNSS positioning is based on trilateration/multilateration, which is a method of determining position by measuring distances to points at known coordinates. In general, the determination of the position of a GNSS receiver 110 in three dimensions may rely on a determination of the distance between the GNSS receiver 110 and four or more satellites 140. As illustrated, 3D coordinates may be based on a coordinate system (e.g., XYZ coordinates; latitude, longitude, and altitude; etc.) centered at the earth's center of mass. A distance between each satellite 140 and the GNSS receiver 110 may be determined using precise measurements made by the GNSS receiver 110 of a difference in time from when a RF signal is transmitted from the respective satellite 140 to when it is received at the GNSS receiver 110. To help ensure accuracy, not only does the GNSS receiver 110 need to make an accurate determination of when the respective signal from each satellite 140 is received, but many additional factors need to be considered and accounted for. These factors include, for example, clock differences at the GNSS receiver 110 and satellite 140 (e.g., clock bias), a precise location of each satellite 140 at the time of transmission (e.g., as determined by the broadcast ephemeris), the impact of atmospheric distortion (e.g., ionospheric and tropospheric delays), and the like.

To perform a traditional GNSS position fix, the GNSS receiver 110 can use code-based positioning to determine its distance to each satellite 140 based on a determined delay in a generated pseudorandom binary sequence received in the RF signals received from each satellite, in consideration of the additional factors and error sources previously noted. With the distance and location information of the satellites 140, the GNSS receiver 110 can then determine a position fix for its location. This position fix may be determined, for example, by a Standalone Positioning Engine (SPE) executed by one or more processors of the GNSS receiver 110. However, code-based positioning is relatively inaccurate and, without error correction, is subject to errors. Even so, code-based GNSS positioning can provide an positioning accuracy for the GNSS receiver 110 on the order of meters.

More accurate carrier-based ranging is based on a carrier wave of the RF signals received from each satellite, and may use measurements at a base or reference station (not shown) to perform error correction to help reduce errors from the previously noted error sources. More specifically, errors (e.g., atmospheric errors sources) in the carrier-based ranging of satellites 140 observed by the GNSS receiver 110 can be mitigated or canceled based on similar carrier-based ranging of the satellites 140 using a highly accurate GNSS receiver at the base station at a known location. These measurements and the base station's location can be provided to the GNSS receiver 110 for error correction. This position fix may be determined, for example, by a Precise Positioning Engine (PPE) executed by one or more processors of the GNSS receiver 110. More specifically, in addition to the information provided to an SPE, the PPE may use base station GNSS measurement information, and additional correction information, such as troposphere and ionosphere, to provide a high accuracy, carrier-based position fix. Several GNSS techniques can be adopted in PPE, such as Differential GNSS (DGNSS), Real Time Kinematic (RTK), and Precise Point Positioning (PPP), and may provide a sub-meter accuracy (e.g., on the order of centimeters). (An SPE and/or PPE may be referred to herein as a GNSS positioning engine, and may be incorporated into a broader positioning engine that uses other (non-GNSS) positioning sources.)

Multi-frequency GNSS receivers use satellite signals from different GNSS frequency bands (also referred to herein simply as "GNSS bands") to determine desired information such as pseudoranges, position estimates, and/or time. Using multi-frequency GNSS may provide better performance (e.g., position estimate speed and/or accuracy) than single-frequency GNSS in many conditions. However, as discussed in more detail hereafter, using multi-frequency GNSS typically uses more power than single-frequency GNSS, e.g., processing power and battery power (e.g., to power a processor (e.g., for determining measurements), baseband processing, and/or RF processing).

Referring again to FIG. 1, the satellites 140 may be members of a single satellite constellation, i.e., a group of satellites that are part of a GNSS system, e.g., controlled by a common entity such as a government, and orbiting in complementary orbits to facilitate determining positions of entities around the world. One or more of the satellites 140 may transmit multiple satellite signals in different GNSS frequency bands, such as L1, L2, and/or L5 frequency bands. The terms L1 band, L2 band, and L5 band are used herein because these terms are used for GPS to refer to respective ranges of frequencies. Various receiver configurations may be used to receive satellite signals. For example, a receiver may use separate receive chains for different frequency bands. As another example, a receiver may use a common receive chain for multiple frequency bands that are close in frequency, for example L2 and L5 bands. As another example, a receiver may use separate receive chains for different signals in the same band, for example GPS L1 and GLONASS L1 sub-bands. A single receiver may use a combination of two or more of these examples. These configurations are examples, and other configurations are possible.

Multiple satellite bands are allocated to satellite usage. These bands include the L-band, used for GNSS satellite communications, the C-band, used for communications satellites such as television broadcast satellites, the X-band, used by the military and for RADAR applications, and the Ku-band (primarily downlink communication and the Ka-band (primarily uplink communications), the Ku and Ka bands used for communications satellites. The L-band is defined by IEEE as the frequency range from 1 to 2 GHz. The L-Band is utilized by the GNSS satellite constellations such as GPS, Galileo, GLONASS, and BDS, and is broken into various bands, including L1, L2, and L5. For location purposes, the L1 band has historically been used by commercial GNSS receivers. However, measuring GNSS signals across more than one band may provide for improved accuracy and availability.

Figure 2:
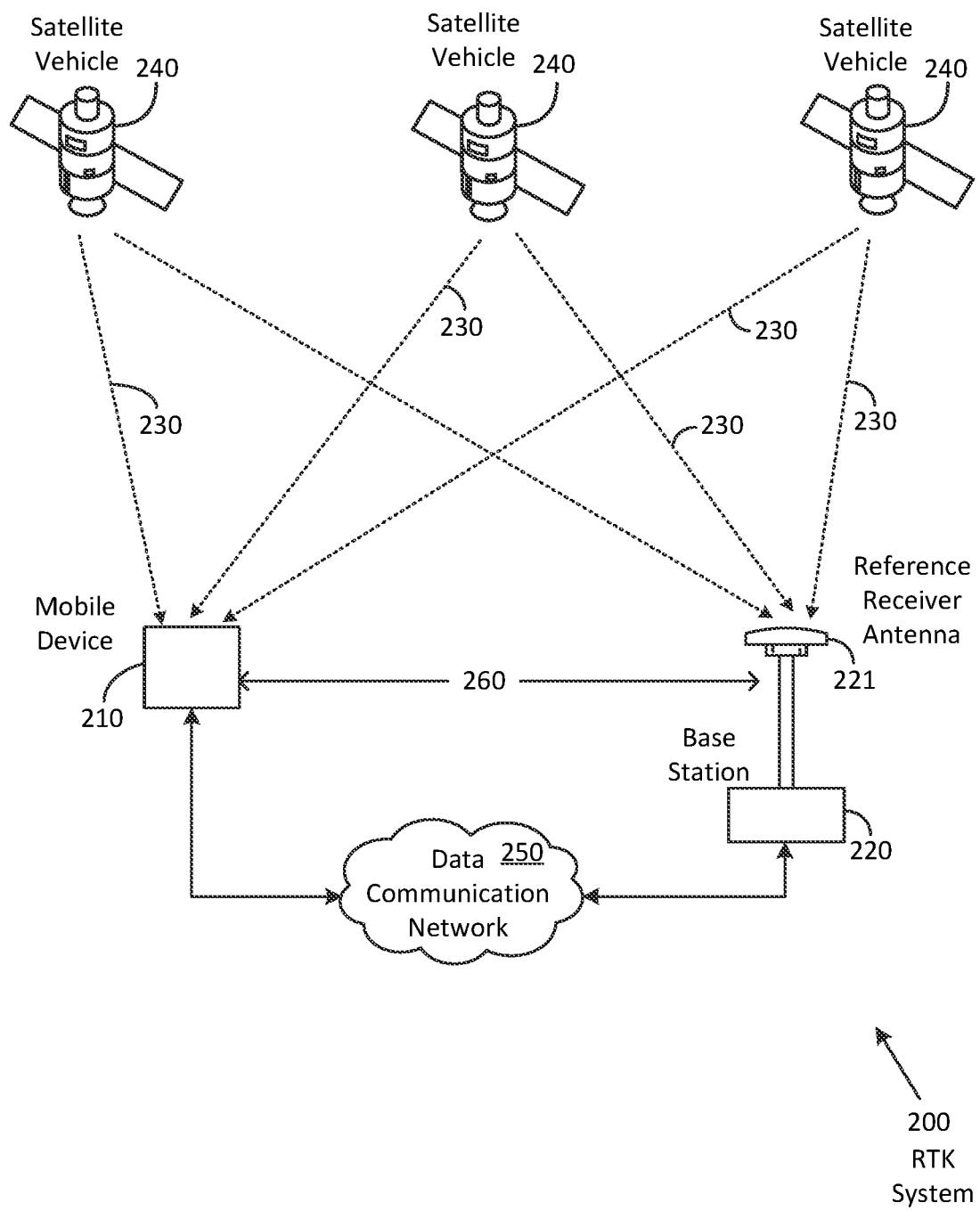
FIG. 2 is a simplified diagram of a real-time kinematic (RTK) system, according to an embodiment.

FIG. 2 is a simplified diagram of an RTK system 200, according to an embodiment. The RTK system 200 can generate RTK correction data that can be used to obtain high-accuracy positioning information based in GNSS measurements. The RTK system 200 can enable a highly accurate GNSS position fix of a mobile device 210 using GNSS receivers at both the mobile device 210 and at a base station 220 that receive RF signals 230 from satellite vehicles (SVs) 240 from one or more GNSS constellations (e.g., Global Position System (GPS), Galileo (GAL), Global Navigation Satellite System (GLONASS), Beidou, etc.). In an example embodiment, the base station 220 includes a reference receiver antenna 221 such as, for example, a geodetic grade reference antenna having a large ground plane and a stable phase center.

The types of mobile device 210 may vary, depending on application. In some embodiments, for instance, the mobile device 210 may comprise consumer electronics or devices, such as a smartphone, a mobile phone, tablet, laptop, wearable device, vehicle, or the like. In some embodiments, the mobile device 210 may comprise industrial equipment, such as survey equipment. In yet other embodiments, the mobile device 210 can be integrated with equipment to provide various location-based functionalities, such as being integrated in vehicles, including autonomous ground, aerial, and maritime vehicles.

It can be further noted that, although the embodiment illustrated in FIG. 2 shows the use of a single base station 220, alternative embodiments may employ more than one base station 220. That is, according to some embodiments, the mobile device 210 may employ RTK correction information from a plurality of base stations 220, individually and/or collectively. As such, it will be understood that references to "a base station" in the description of the embodiments herein may refer to one base station of a plurality of base stations.

To perform a traditional GNSS position fix, the mobile device 210 can use code-based positioning to determine a distance of each of the SVs 240 based on a determined delay in a generated pseudorandom binary sequence received in the RF signals 230, and the resulting accuracy of the position fix for the mobile device 210 is subject to errors caused by SV 240 orbit and clock, ionosphere and troposphere delays, and other phenomena. Although this can provide accuracy on the order of meters, this accuracy may be insufficient for many applications.

As noted, RTK can provide enhanced accuracy (e.g., on the order of centimeters or decimeters) by using carrier-based ranging based on the carrier phases of the RF signals 230 and using the base station 220 to help reduce errors from various error sources. The base station 220 can include a fixed GNSS receiver that, using carrier-based ranging and known position, determines correction information to reduce the errors as described above (e.g., orbit and clock errors, ionosphere and troposphere delays, etc.). The correction information can then be provided to the mobile device 210 via, for example, a data communication network 250, or via radio broadcast.

The RTK correction information can be valid when a separation distance 260 between mobile device 210 and the base station 220 does not exceed a threshold distance. That is, the RTK correction information can assume similar errors (such as atmospheric errors) between base station 220 and mobile device 210, based on the mobile device 210 being within a threshold separation distance of the base station 220. If RTK system 200 includes just a single base station 220, the baseline may be on the order of 10-20 km. If multiple base stations 220 are included in RTK system 200, the baseline may be on the order of 40-50 km. In an embodiment in accordance with disclosure, the baseline is less than 30 meters and RTK correction information may be obtained over a period of time that extends, for example, over several days.

Figure 3:
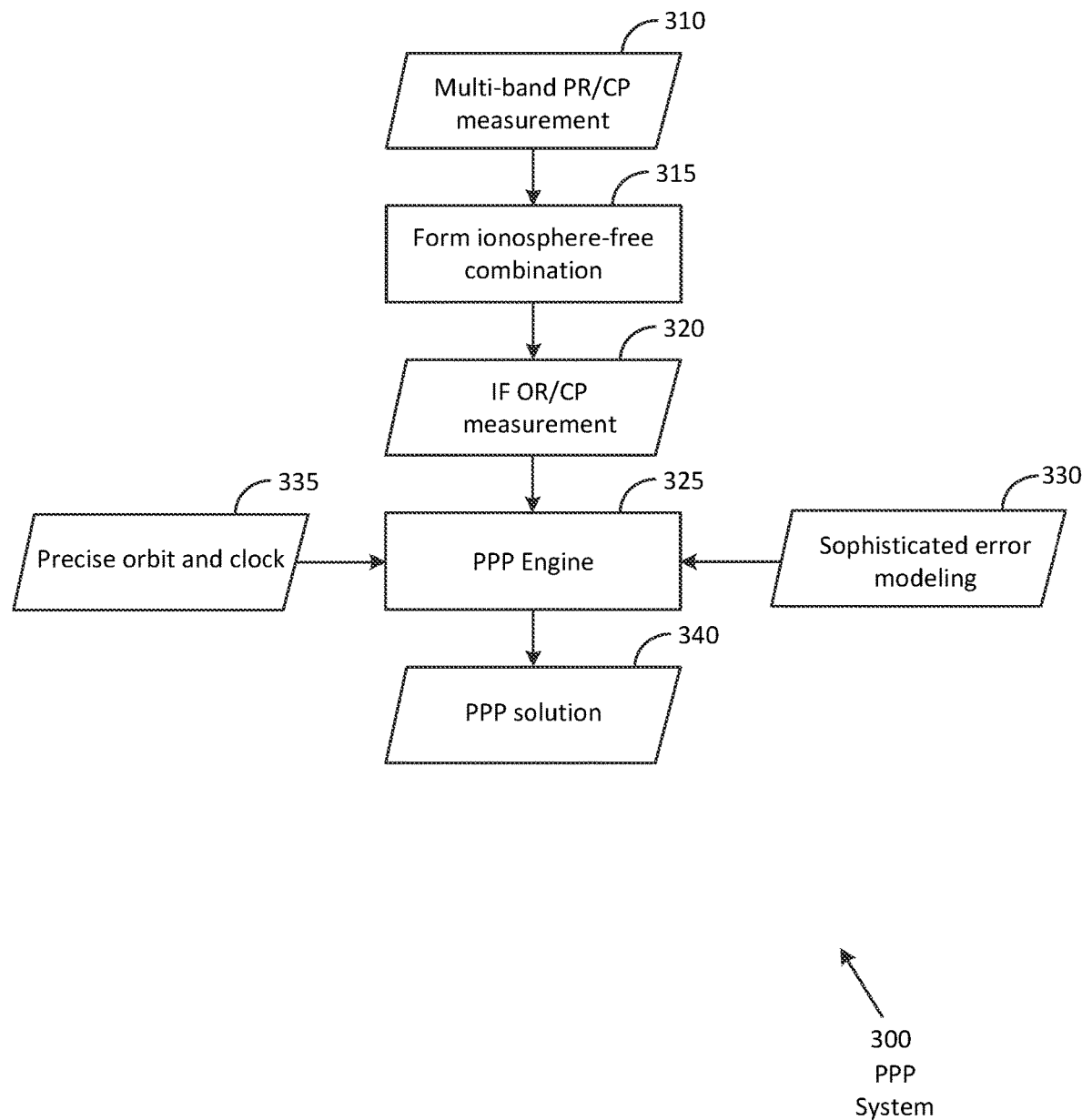
FIG. 3 is a block diagram illustrating a first example precise point positioning (PPP) operation, according to aspects of the disclosure.

FIG. 3 is a block diagram of a Precise Positioning Engine (PPE) 300, which may be used to determine an accurate PPP-based position. In some cases, PPE 300 may be used, at least in part, to apply PPP correction information to RTK correction information. The blocks in FIG. 3 indicate data and logical processes used by a PPE to perform PPP-based positioning of a GNSS receiver (e.g., a GNSS receiver provided in a mobile device in accordance with the disclosure). The PPE may be executed by one or more processors of the GNSS receiver and/or a device (e.g. mobile device) into which the GNSS receiver may be integrated.

Figure 8:
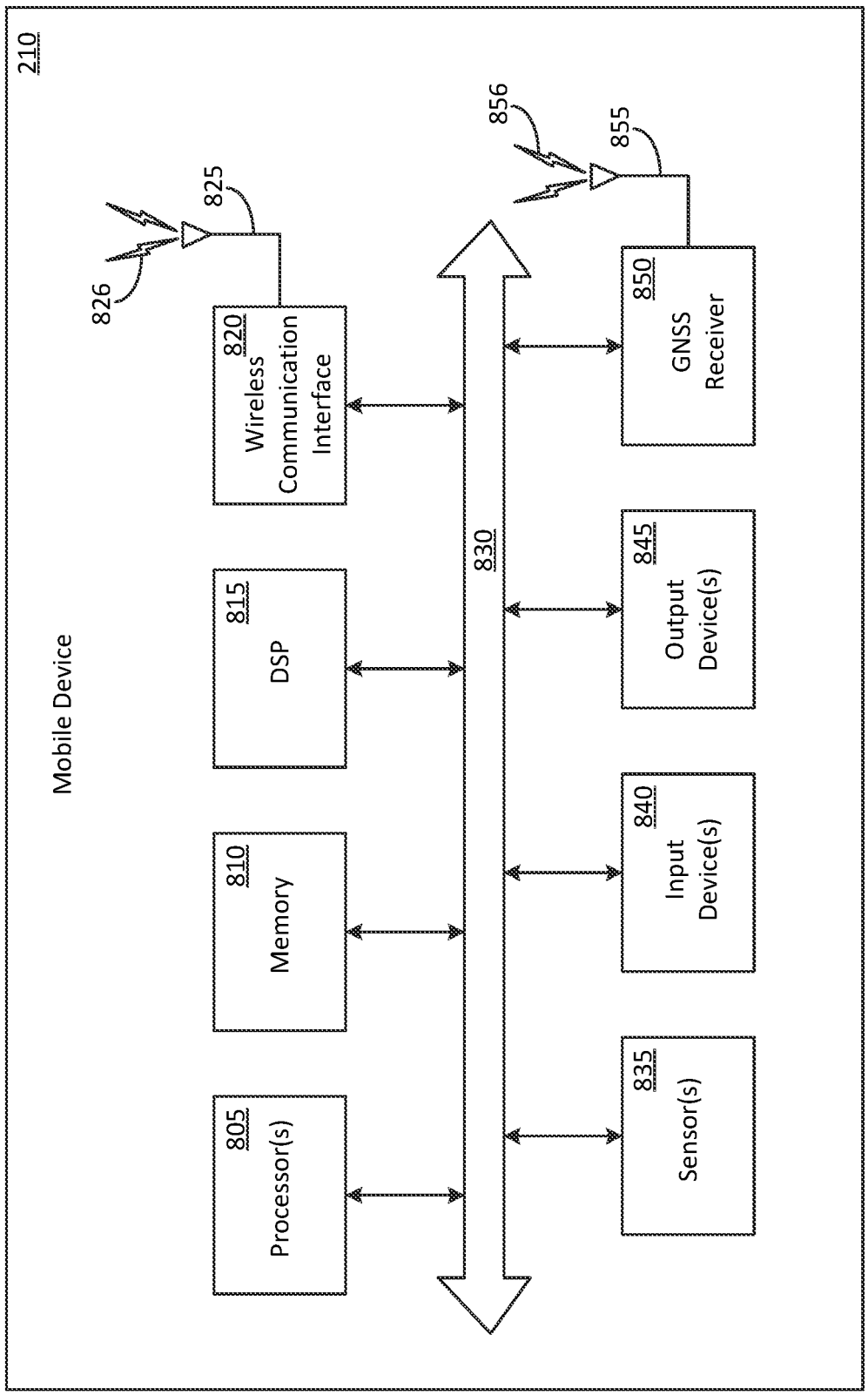
FIG. 8 illustrates some example functional components of an example mobile device, which can be applicable to various embodiments described herein.

An example of a mobile device in the form of a phone is illustrated in FIG. 8 and described below. The example phone has two antennas, one that may be configured to operate at a first global navigation satellite system frequency (L1, for example) and/or another that may be configured to operate at a second global navigation satellite system frequency (L2, for example). A PPE-based position measurement may be carried out by a processor of the phone, based on GNSS signals received through either of the two antennas (depending on which frequency is used for the measurement).

At block 310, the GNSS receiver obtains multi-band pseudo-range (PR) and carrier phase (CP) measurement of signals from each of the plurality of satellites (e.g., GNSS satellites 140 of FIG. 1 or SVs 240 of FIG. 2). PR and CP measurements may correspond with code-based and carrier-based measurements, respectively, as previously described. To make a multi-band measurement (a measurement of signals using two or more frequencies transmitted by a satellite), embodiments may use a multi-band GNSS receiver (e.g., a dual-band receiver, tri-band receiver, etc.) capable of receiving a plurality of frequency bands. Some embodiments may use multi-constellation multi-frequency (MCMF) receivers capable of receiving multiple frequency bands on multiple constellations. Examples of different bands used for the multi-band PR/CP measurement at block 310 include, L1/L5 for GPS, E1/E5A for GAL, and B1C/B2A for BDS. Other embodiments may use additional or alternative bands and/or GPS constellations.

At block 315, an ionosphere-free (IF) combination is formed. An ionosphere-free combination includes a linear combination of code and/or carrier measurements that can eliminate first order ionospheric effects from ionospheric refraction, which can increase the accuracy of the positioning solution. As shown by block 320, the ionosphere-free (IF) PR/CP measurement formed from the IF combination is provided to the PPP engine 325.

The sophisticated error modeling at block 330 includes error modeling to mitigate inaccuracies based on various error sources. Standard PPP error mitigation includes error reduction techniques to reduce satellite different code bias (DCB), satellite phase windup-up, site displacement, and more. These errors may result in inaccuracies of several meters or more, and mitigation can be performed by a Kalman Filter (KF), which may estimate these errors/values.

The PPP engine 325 uses the IF PR/CP measurement (block 320), sophisticated error modeling (block 330), and precise orbit and clock (block 335) to conduct a KF estimation to provide the PPP solution at block 340. As a person of ordinary skill in the art will appreciate, a PPP engine can be implemented using an Extended Kalman Filter (EKF).

A mobile device may utilize a PPE to provide high-precision positioning using PPP and/or RTK correction information. Both PPP and RTK have benefits and drawbacks. For RTK, which derives correction information from differential GNSS readings between a mobile device (or "rover station") and one or more local base stations, benefits include simple error modeling computation and better performance on error canceling. The drawbacks of RTK, however, include the need for local or regional reference stations and a larger bandwidth requirement (relative to PPP). For PPP, which involves providing precise orbit/clock information to a target device (and optional ionosphere and troposphere correction for additional enhancement), benefits include a low bandwidth requirement (relative to RTK) and global coverage. Drawbacks of PPP include the need for complex error modeling computation.

Because RTK is widely implemented among devices but maybe limited in coverage, situations may arise where RTK-compatible devices are unable to provide a high-precision RTK-based position due to lack of RTK correction information. This may be despite the presence of available PPP correction information, which has global coverage. More particularly, in accordance with the disclosure, RTK and/or PPP measurements performed by use of a mobile device such as, for example, a smartphone, can be enhanced by taking into consideration PCO and/or PCV parameters of one or more antennas of the mobile device. Further details pertaining to such enhancement are provided below.

Figure 4:
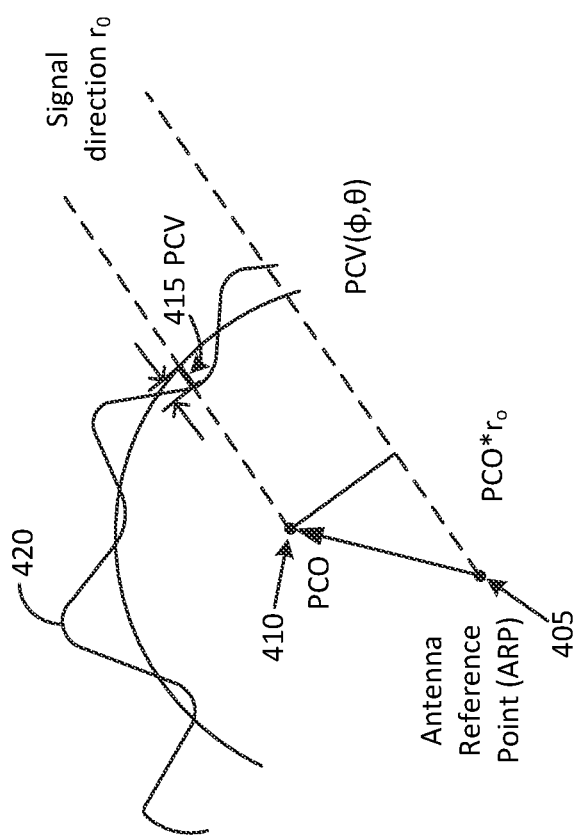
FIG. 4 illustrates the concept of phase center offset (PCO) and phase center variation (PCV).

FIG. 4 illustrates the concept of phase center offset (PCO) and phase center variation (PCV). As indicated above, a phase sphere is not perfectly spherical in real life situations. In the example illustration shown in FIG. 4, a phase sphere 420 corresponding to a real-life antenna, has an irregular contour. Three parameters that may be deemed important for GNSS applications are illustrated in the form of an antenna reference point (ARP) 405, PCO 410, and PCV 415. ARP 405 can be an identifiable point on an antenna support structure (a frame, an antenna mast, or a chassis, for example). ARP 405 may be used in various types of traditional scenarios such as, for example, when installing/ positioning surveying equipment for performing a survey operation, when installing a terrestrial antenna for GNSS operations, or when performing a GNSS ranging operation. In accordance with the disclosure, a correction/enhancement operation is performed upon a GNSS-based measurement by taking into consideration the offset value indicated in the form of PCO 410. PCO 410 is offset with respect to ARP 405 and represents a mean location of a phase center of the real-life antenna.

Furthermore, and in accordance with the disclosure, an additional correction/enhancement operation can be performed upon the GNSS-based measurement by taking into consideration PCV 415, which represents a phase shift encountered by a signal received from a satellite in a signal direction $r_0$. This phase shift may be taken into consideration and compensated for, in a GNSS-based measurement, particularly in millimeter (mm) ranging applications so as to achieve sub-millimeter positioning accuracy.

In an example scenario, the compensation/correction procedure can be represented as follows:

$$S_{ARP} = r + PCO*r_0 + PCV(\phi, \theta) + \varepsilon, \text{ where } \phi, \theta \text{ are azimuth and elevation angles towards the signal source.}$$

In general, the relationship between ARP 405, PCO 410, and PCV 415 of an antenna of a device stays unchanged over time with respect to the signal received from a satellite in the signal direction $r_0$. This relationship is referred to herein as a phase center profile. In a device having two antennas (or more), a first antenna may have a first phase center profile that is defined on the basis of a fixed reference point on the chassis of the device and a second antenna of the device may have a second phase center profile that is defined on the basis of the same fixed reference point on the chassis of the device. However, the PCV and PCO parameters of the two antennas can be different depending upon the structure of each of the two antennas and a layout of the two antennas in the device.

The impact of PCV and/or PCO parameters in GNSS-based operations such as RTK and PPP, is fairly predictable when the device is a large device and an antenna of the large device has a large ground plane and a stable phase center. For example, PCV and/or PCO parameters of an antenna provided in a vehicle or mounted upon a fixture on a building, can be fairly predictable. In some scenarios, a manufacturer of the vehicle or a manufacturer of such an antenna may provide information about the PCO and/or PCV parameters to an end-user and the end-user may use this information when carrying out GNSS-based measurements. Also, the differences in PCV and/or PCV parameters between each antenna in a batch of manufactured antennas may have a known and acceptable level of variation.

However, in the case of a mobile device, and particularly, in the case of a smartphone, the small size of the mobile device and other factors (cost, layout limitations, etc.) may lead to the PCV and/or PCO parameters of an antenna of a first mobile device being significantly different from a similar antenna of a similar second mobile device, even when both mobile devices are a part of the same manufactured batch. Furthermore, the PCV and/or PCO parameters of a first antenna in a mobile device may be different than the PCV and/or PCO parameters of a second antenna that may be included in the mobile device. Consequently, it is problematic to provide a uniform/standard set of PCV and/or PCO parameters that is applicable to every mobile device of a set of mobile devices, even when the mobile devices are a part of the same manufactured batch.

This issue can be resolved, in accordance with the disclosure by determining a phase center profile of each antenna of each mobile device, in the manner described below. The phase center profile provides PCV and PCO information that is specific to each mobile device and may be used in conjunction with attitude information of the mobile device each time the mobile device is used subsequently for performing GNSS-based measurements. These aspects are described below in further detail.

The attitude can vary each time the smartphone is used, due to various reasons such as, for example, holding the smartphone in different ways, flipping open the smartphone to various extents on various occasions, using the smartphone in open/closed environments, etc.). Consequently, and in accordance with one embodiment of the disclosure, each GNSS-based measurement can be compensated/enhanced based on the attitude of the smartphone when a PCV parameter and/or a PCO parameter is being evaluated as a part of the GNSS-based measurement.

Figure 5:
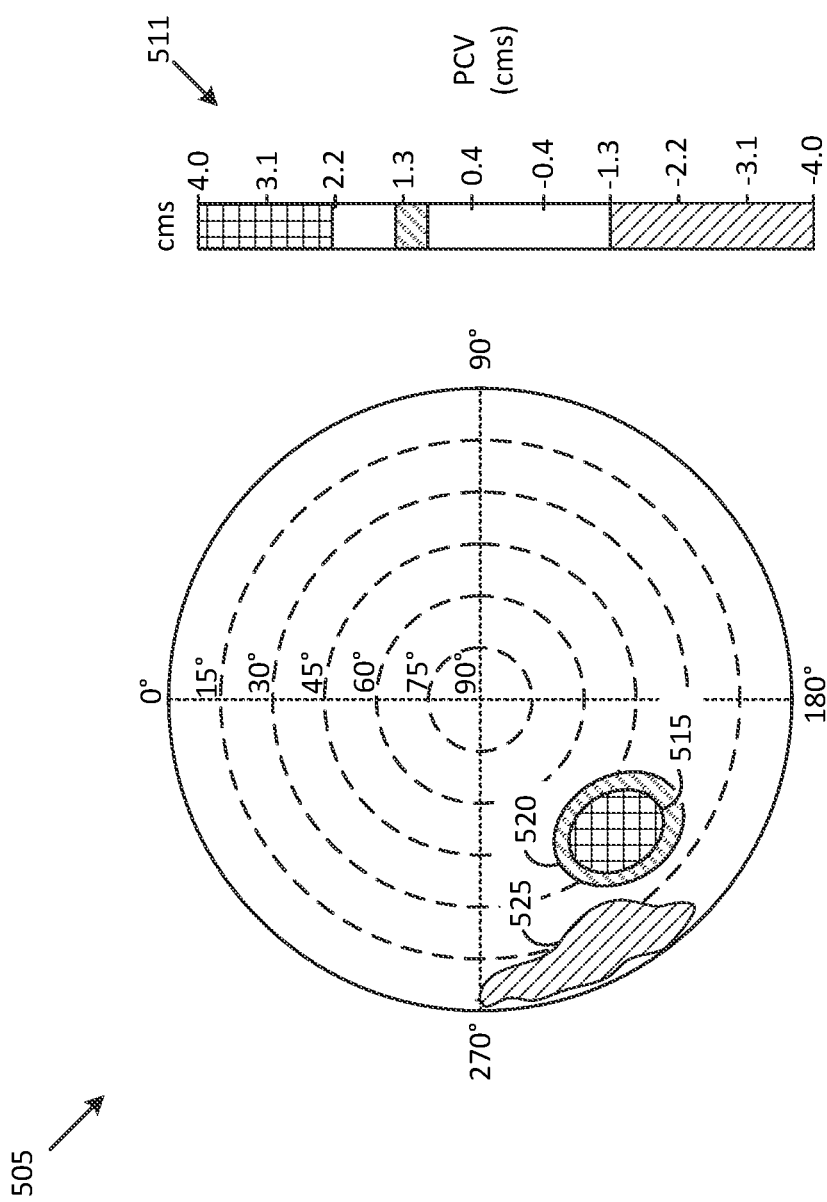
FIG. 5 illustrates an example polar plot associated with a PCV characteristic of a first antenna, according to an embodiment.

FIG. 5 illustrates an example polar plot 505 associated with a PCV characteristic of a first antenna, according to an embodiment. The example polar plot 505 illustrates various PCV values associated with various elevation and azimuth values of the first antenna for a first frequency. The various PCV values are indicated in a scale 511. The polar plot of the first antenna can be different for a second frequency. Thus, a polar plot not only may be particular to a specific antenna, as previously noted, but also may be specific to a particular frequency of the antenna.

In an example implementation, the first antenna can be a part of a mobile device (a smartphone, for example) and is configured to operate at a first global navigation satellite system frequency (L1, for example) and/or a second global navigation satellite system frequency (L2, for example). A contour 515 indicates a set of PCV values exceeding about 2.2 cms for polar values centered in a first area illustrated in the polar plot 505. A contour 520 indicates a set of PCV values roughly corresponding to a range of about 1 cm to 1.4 cms in polar values and corresponding to a second area illustrated in the polar plot 505. The second area is a wider area overlapping the first area. A contour 525 indicates a set of PCV values roughly corresponding to a range of about −1.3 cm to −4 cms in polar values and corresponding to a third area illustrated in the polar plot 505.

As can be understood from the example polar plot 505, the PCV values of the first antenna can vary between 4 cms to −4 cms. This range of PCV values can contribute to a level of uncertainty (ambiguity, tolerance, etc.) in determining a position of the mobile device based on a GNSS operation. It is desirable in accordance with the disclosure to take this level of uncertainty into consideration when interpreting the position of the mobile device obtained by performing the GNSS operation by use of the first antenna. Further details pertaining to this aspect are provided below.

Figure 6:
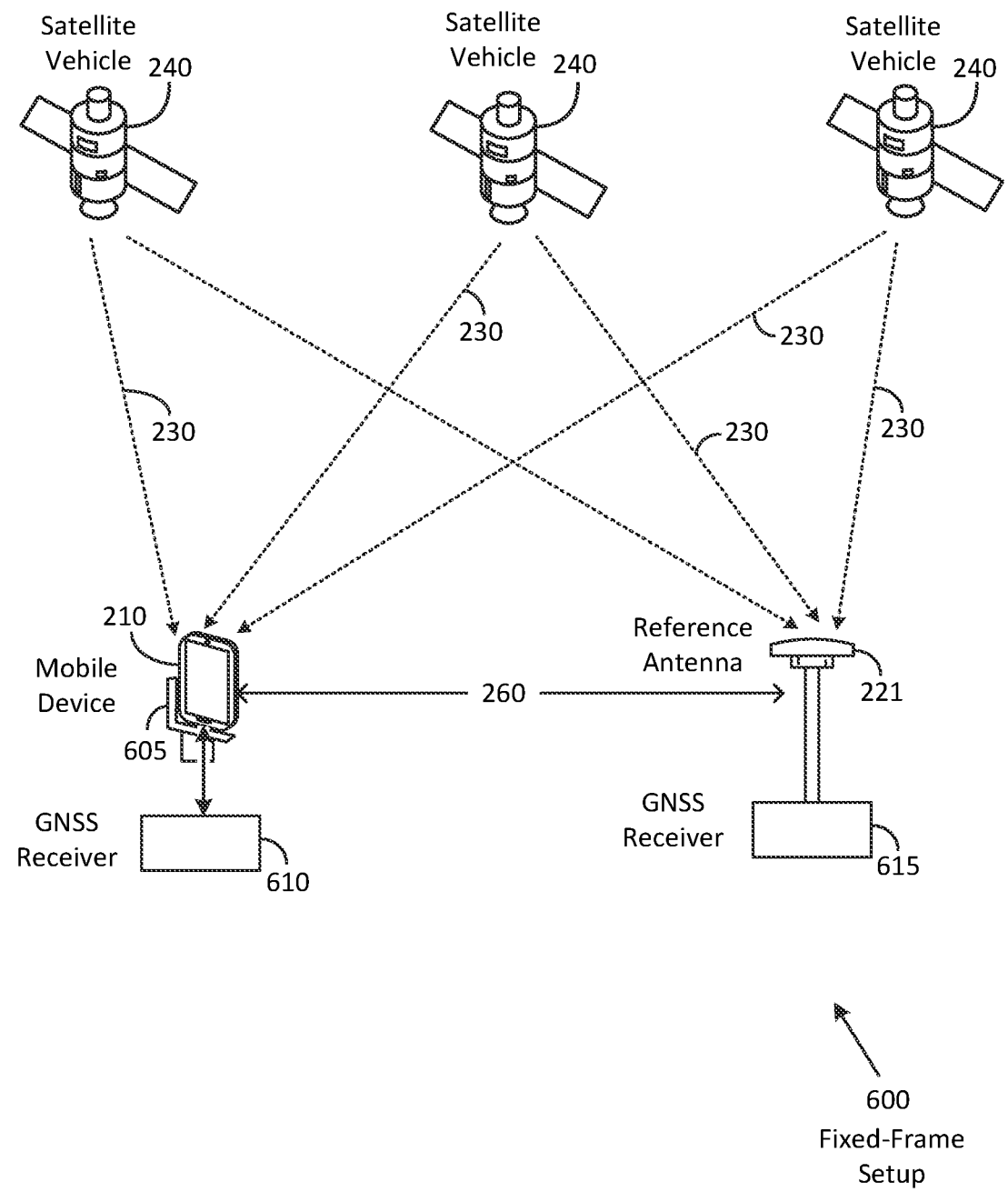
FIG. 6 is a simplified diagram of a system that is configured for performing a double-difference carrier phase operation, according to an embodiment.

FIG. 6 is a simplified diagram of a system 600 that is configured for performing one aspect of a double-difference carrier phase operation by use of a mobile device 210, according to an embodiment. More particularly, the illustrated diagram pertains to the mobile device 210 placed in a fixed-frame condition for determining a phase center profile of an antenna of the mobile device 210. The phase center profile of the antenna may be subsequently combined with attitude information of the mobile device 210 when the mobile device 210 is in a non-fixed frame condition (handheld, for example) during a GNSS-based measurement. In one embodiment, the mobile device 210 can include more than one antenna and each antenna can have a unique phase center profile.

Some of the components shown in FIG. 6 replicate like-numbered components shown in FIG. 2. The double-difference carrier phase operation performed by use of the system 600 can be used to calibrate the antenna and/or to determine a base-line reference that can be used for performing compensation actions associated with subsequent GNSS-based location/position detection operations.

In the illustrated scenario, the mobile device 210 is a phone that can include one or more antennas configured to receive GNSS signals from one or more of the satellite vehicles (SVs) 240. For example, the phone can include a first receiver antenna configured to receive an L1 signal (1575.42 MHZ) and a second receiver antenna configured to receive an L5 signal (1176.45 MHZ). The PCV and PCO parameters of the two antennas may differ with respect to one another not only when the smartphone is in a stationary condition but may further differ with respect to one another when the smartphone is moved around. One factor that can contribute to a change in PCV and/or PCV is an attitude of the smartphone. More particularly, various attitudes of the mobile device 210 can impact GNSS-based measurements in various ways.

A GNSS receiver 615 is coupled to the reference receiver antenna 221 that is retained in a fixed position and has a fixed attitude. The mobile device 210 is also retained in a fixed position and a fixed attitude that is referred to herein as a "fixed-frame condition." The fixed-frame condition is implemented in this example by means of a support 605. A GNSS receiver 610 is coupled to the mobile device 210 and is configured to carry out a GNSS-based positioning measurement procedure upon GNSS signals received via the mobile device 210.

In an example scenario in accordance with the disclosure, a first GNSS-based position measurement procedure is carried out when the mobile device 210 is in the "fixed-frame condition." Another GNSS-based position measurement procedure may then be carried out when the mobile device 210 is in a "non-fixed frame condition" such as, for example, when the mobile device 210 is a phone that is being moved around by an individual during activities such as making a phone call, using an application stored in the phone, or accessing the Internet.

When in the "non-fixed frame condition," the mobile device 210 can have any one or more of various attitudes. Each attitude can include, for example, a unique tilt, slant, inclination, or orientation in any of three axes (x-axis, y-axis, and z-axis), and movement along one or more of the three axes. Each attitude can also include movement along any of three axes and contact with various surfaces (for example, cheek, ear, shoulder, etc.). Attitude information of a mobile device 210 may be obtained by use of various sensors of the mobile device 210 such as, for example, by a gyroscope, an inertial measurement unit (IMU), an accelerometer, a motion detector, a proximity sensor, a magnetometer, an ambient light sensor, and a fingerprint scanner.

An example GNSS-based position measurement procedure carried out over a period of time by use of the mobile device 210 that is in the fixed-frame condition will now be described. The period of time can range, for example, from about an hour to one or more days. The GNSS-based positioning measurement procedure can include a double difference (DD) carrier phase measurement, which is one form of measurement that may be used for determining a position of an object.

A general mathematical model for the carrier phase measurements in units of cycles can be expressed as follows:

$$\phi(t) = \frac{1}{\lambda}[r(t) - I + T] + f(\delta t_u - \delta t^s) + N + \epsilon_\phi$$

where ϕ is the partial carrier phase cycle measured by a receiver, λ is the carrier wavelength, f is the carrier frequency, r is the geometric range between the receiver and a satellite, I is the ionospheric advance, T is the tropospheric delay, $\delta t_u$ is the receiver clock bias, $\delta t^s$ is the satellite clock bias, and N is the integer bias. The integer bias is an ambiguity that cannot be measured and has to be estimated. However, the integers remain constant as long as carrier phase lock is maintained.

A mathematical model for carrier phase measurements that are based on signals received from multiple satellites by a receiver antenna of the mobile device 210, can be expressed as follows:

$$\phi_u^k(t) = \frac{1}{\lambda}\left[r_u^k(t) - I_u^k + T_u^k\right] + f\left(\delta t_u - \delta t^k\right) + N + \varepsilon_{\phi,u}^k$$

where the subscript u refers to the GNSS receiver 610 and the superscripts k refer to a $k^{th}$ satellite.

A similar expression for carrier phase measurements that are based on signals received from multiple satellites by the reference receiver antenna 221, can be as follows:

$$\phi_r^k(t) = \frac{1}{\lambda}\left[r_r^k(t) - I_r^k + T_r^k\right] + f\left(\delta t_r - \delta t^k\right) + N + \varepsilon_{\phi,r}^k$$

where the subscript r refers to the GNSS receiver 615) and the superscripts k refer to a $k^{th}$ satellite.

The two expressions described above with respect to the receiver antenna of the mobile device 210 and the reference receiver antenna 221 can be mathematically manipulated to eliminate some irrelevant terms that may be viewed as nuisance terms. One procedure to do so is generally known as a single difference (SD) reference carrier phase procedure.

In accordance with the single difference (SD) reference carrier phase procedure, the separation distance 260 between the mobile device 210 and the reference receiver antenna 221 is configured to be very small (less than 30 meters, for example), thereby allowing for ignoring of the ionospheric and tropospheric effects upon the measurement. The satellite clock bias term can also be ignored based on cancellation as a part of the mathematical manipulations. However, two unknown terms (the receiver clock bias $\delta t_u$ and the integer bias N (integer ambiguity)) remain. The two unknown terms can be addressed by a double difference (DD) carrier phase operation.

The DD carrier phase operation, which is carried out by the use of two satellites, can be expressed mathematically as follows:

$$\phi_{ur}^{kl} = (\phi_u^k - \phi_r^k) - (\phi_u^l - \phi_r^l)$$

$$\phi_{ur}^{kl} = \phi_{ur}^k - \phi_{ur}^l$$

$$\phi_{ur}^{kl} = \frac{1}{\lambda}(r_{ur}^k - r_{ur}^l) + f(\delta t_{ur} - \delta t_{ur}) + (N_{ur}^k - N_{ur}^l) + (\varepsilon_{ur}^k - \varepsilon_{ur}^l)$$

$$\phi_{ur}^{kl} = \frac{1}{\lambda}r_{ur}^{kl} + N_{ur}^{kl} + \varepsilon_{ur}^{kl}$$

As can be understood from the equations above, particularly, from the expression associated with, $\phi_{ur}^{kl}$, the integer bias terms are eliminated. A relative position vector can then be formed based on a geometry of the receivers with respect to the SVs.

A double difference (DD) carrier phase measurement executed in a conventional manner fails to take into consideration variations in PCO and PCV parameters as result of variations in attitude of the device that is used for performing the measurement. For example, when the mobile device 210 is a phone, the phone may have a first attitude when an individual holds the phone in a first position (angled and pressed against a cheek, for example) over a first period of time. The phone may have a second attitude when the individual holds the phone in a second position over a second period of time, such as, for example, when using a speaker of the phone (horizontal and away from the cheek).

It must be understood that the description provided above with reference to a phone is equally applicable to many other types of mobile devices. For example, an attitude of an unmanned aerial vehicle (UAE) over a first period of time may be different than an attitude of the UAV over a second period of time. Additional aspects associated with incorporating phase center profiles into position determining procedures such as double difference (DD) carrier phase procedures based on GNSS-based measurements, are described below.

Figure 7A:
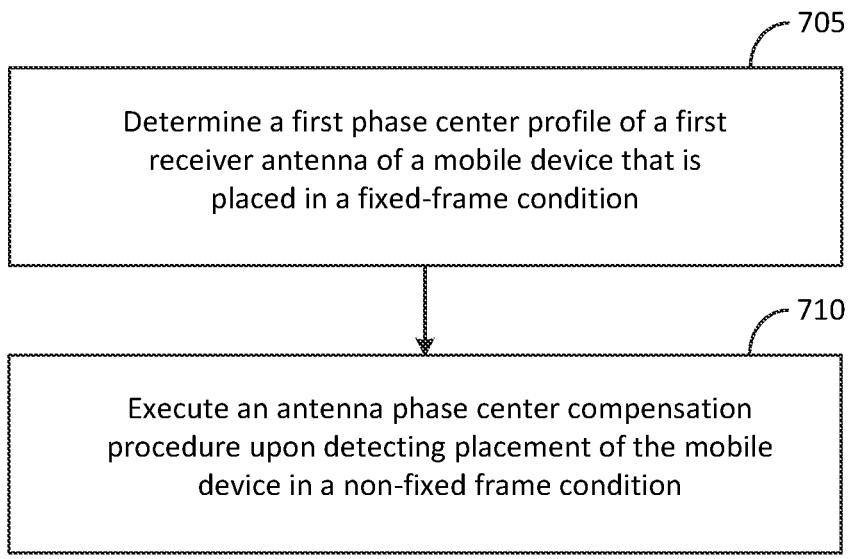
FIGS. 7A and 7B illustrate a flow diagram of a method for antenna phase center compensation in global navigation satellite system (GNSS)-based positioning, according to an embodiment.
Figure 7B:
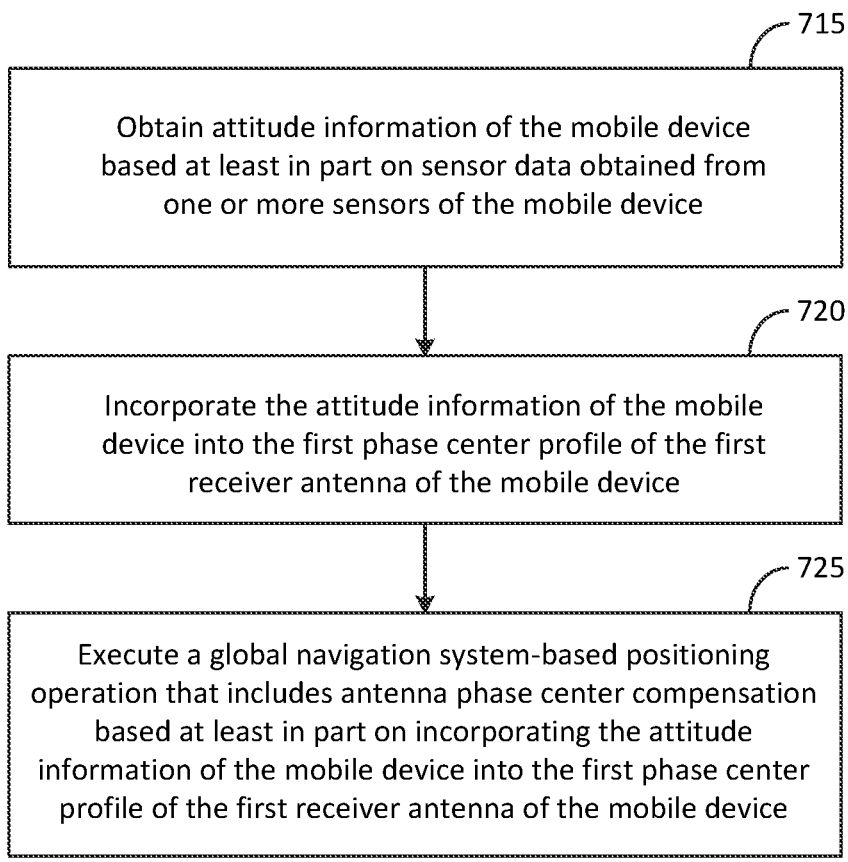

FIGS. 7A and 7B is a flow diagram 700 of a method for antenna phase center compensation in global navigation satellite system (GNSS)-based positioning, according to an embodiment. Means for performing the functionality illustrated in one or more of the blocks shown in FIGS. 7A and 7B may be performed by hardware and/or software components of a mobile device such as, for example, a smartphone. In some examples, the mobile device may perform the functionality illustrated in one or more of the blocks shown in FIGS. 7A and 7B in an operating environment such as illustrated by the system 600 shown in FIG. 6 and described above. Example components of a mobile device are illustrated in FIG. 8, which is described below in more detail.

At block 705, the functionality can include determining a first phase center profile of a first receiver antenna of a mobile device that is placed in a fixed-frame condition such as, for example, the mobile device 210 that is placed upon the support 605 as illustrated in FIG. 6. In an example embodiment, determining the phase center profile of a receiver antenna of the mobile device 210 can be carried out by executing a GNSS-based carrier phase measurement.

A ranging equation associated with the GNSS-based carrier phase measurement includes a PCV term and a PCO term. An example ranging equation that includes a PCV term can be expressed mathematically as follows:

$$\nabla\Delta\Phi^{i,j} = \nabla\Delta\rho^{i,j} + \nabla\Delta N^{i,j} + \nabla\Delta PCV^{i,j}(Ele, Azi) + \nabla\Delta MP^{i,j} + \nabla\Delta\epsilon^{i,j}$$

where i refers to the antenna, j refers to the satellite, $\nabla\Delta\Phi^{i,j}$ is the DD carrier phase, $\nabla\Delta\rho^{i,j}$ is the geometry, $\nabla\Delta N^{i,j}$ is the integer ambiguity, $\nabla\Delta PVC^{i,j}$ (Ele, Azi) is a PCV component, $\nabla\Delta MP^{i,j}$ is a multi-path factor, and $\nabla\Delta\epsilon^{i,j}$ is a noise factor. The PCV component includes elevation parameters as well as azimuth parameters.

The ranging equation can be mathematically manipulated to eliminate nuisance terms and to estimate the PCV term. Eliminating the nuisance terms can be carried out in the manner described above with reference the system 600 shown in FIG. 6.

A reduced ranging equation that remains after elimination of the nuisance terms can be expressed mathematically as follows:

$$\nabla\Delta\Phi^{i,j} = \nabla\Delta PCV^{i,j} + \nabla\Delta\epsilon^{i,j}$$

where $\nabla\Delta PCV^{i,j}$ is the PCV component, and $\nabla\Delta\epsilon^{i,j}$ can be viewed as a catch-all residual that includes, for example, a noise component as well as other undeterminable components.

In one embodiment, the value of the $\nabla\Delta PCV^{i,j}$ component can be estimated based on the reduced ranging equation and taken into consideration when determining the position information of the mobile device based on $\nabla\Delta\Phi^{i,j}$. For example, the position information can be corrected by compensation based in part on the $\nabla\Delta PCV^{i,j}$ value, which represents the PCV portion of the first phase center profile of the first receiver antenna. This procedure is described below with reference to block 810 and subsequent blocks.

A PCO portion of the first phase center profile of the first receiver antenna may be then identified and used in conjunction with, or in lieu of, the PCV portion, to compensate the position information.

The first phase center profile of the first receiver antenna of the mobile device can be described, based in part, on the following PCV and PCO expressions, each of which includes an elevation component and an azimuth component:

$$PCV^{Li} = f_{PCV}(ele, azi)$$

$$PCO^{Li} = f_{PCO}(ele, azi)$$

The functionality described above with respect to the block 705 pertains to obtaining a phase center profile of a first receiver antenna of a mobile device that is placed in a fixed-frame condition. The phase center profile is independent of GNSS satellite positions and typically does not vary over time. The functionality, which can be replicated for one or more other antennas of the mobile device, can be used to calibrate the antenna and/or to determine a base-line reference that can be used for performing compensation actions associated with subsequent GNSS-based location/position detection operations.

At block 710, the functionality can include executing an antenna phase center compensation procedure upon detecting placement of the mobile device in a non-fixed frame condition. The non-fixed frame condition can come into play when the mobile device 210 shown in FIG. 6 is removed from the support 605 and moved around such as, for example, when a phone is removed from the support 605 and carried around by an individual. Executing of the phase center compensation procedure is described below with reference to the flow diagram illustrated in FIG. 7B.

At block 715, the functionality can include obtaining attitude information of the mobile device. In an example implementation, the attitude information is obtained from one or more sensors of the mobile device. Attitude information such as, for example, roll, pitch, and heading information can be obtained from one or more sensors such as, for example, an inertial measurement unit (IMU), a gyroscope, an accelerometer, a motion detector, a proximity sensor, and/or a magnetometer.

In an example scenario at a first instant in time, attitude information of the mobile device based on PCV and PCO parameters can be expressed as follows:

$$PCV^{Li} = f_{PCV}(\text{roll,pitch,heading})$$

$$PCO^{Li} = f_{PCO}(\text{roll,pitch,heading})$$

The attitude information can change when the mobile device is subsequently used for performing another antenna phase center compensation procedure. In other scenarios, the attitude information can include parameters other than, or in addition to, the roll, pitch, and heading.

At block 720, the functionality can include incorporating the attitude information of the mobile device into the first phase center profile of the first receiver antenna of the mobile device. The functionality can be replicated for one or more other phase center profiles of one or more other receiver antennas of the mobile device.

In an example embodiment, incorporating the attitude information of the mobile device into the first phase center profile of the first receiver antenna may include determining a rotation matrix R based on the attitude profile of the mobile device. The rotation matrix can then be applied in a computation procedure to align the body frame of the mobile device to an earth-centered, earth-fixed (ECEF) frame. Aligning the body frame to the ECEF frame allows for execution of a GNSS-based measurement procedure based on one or more specific GNSS satellites.

At block 725, the functionality can include executing a GNSS-based positioning operation such as, for example, an RTK operation or a PPP operation, that includes antenna phase center compensation based on incorporating the attitude information of the mobile device into the first phase center profile of the first receiver antenna of the mobile device as described above with reference to block 720.

In an embodiment, the antenna phase center compensation may be based on, what can be referred to, as measurement uncertainty associated with the antenna phase center profile (PCV and/or PCV) of the first antenna. The measurement uncertainty associated with pseudo-range (Pr) and carrier phase (Cp) can be expressed as follows:

$$Pr\ Unc^{Li} = f(ele, azi) + c_1 PCV^{Li} + c_2 PCO^{Li}$$

$$Cp\ Unc^{Li} = f(ele, azi) + c_1 PCV^{Li} + c_2 PCO^{Li}$$

where c1 and c2 are weighting factors.

In an embodiment, applying the antenna phase center compensation upon the result of a double difference (DD) carrier phase operation can involve identifying and/or predicting an extent of measurement uncertainty present in a positioning estimation process due to the phase center variation (PCV) profile of the first receiver antenna. The positioning estimation process can include an R matrix modeling in a Kalman filter operation.

The procedure described above can be repeated for determining a second phase center profile of a second receiver antenna of the mobile device after placing the mobile device in a fixed-frame condition. An antenna phase center compensation procedure can be executed later when the mobile device is in a non-fixed frame condition. The antenna phase center compensation procedure can include obtaining attitude information of the mobile device and incorporating the attitude information into the second phase center profile in the manner described above. A GNSS-based positioning operation such as, for example, the DD carrier phase operation described above can be carried out based on the antenna phase center compensation. In an embodiment, the mobile device can be a phone having a first receiver antenna configured to receive a first type of GNSS signal such as, for example, an L1 signal (1575.42 MHZ), and a second receiver antenna configured to receive a second type of GNSS signal such as, for example, an L5 signal (1176.45 MHz).

In an embodiment, the phase center profile(s) of the receiver antenna(s) of the mobile device may be determined by a manufacturer of the mobile device and may be stored in a memory of the mobile device for use in subsequent GNSS-based location/position detection operations performed by a user of the mobile device.

FIG. 8 is a block diagram of various hardware and software components of the mobile device 210, according to an embodiment. These components can be utilized as described herein above. For example, the mobile device 210 can perform the operations of the method illustrated in FIGS. 7A and 7B, and/or one or more of the functions of a GNSS receiver as described in the embodiments herein. It should be noted that FIG. 8 is meant only to provide a generalized illustration of various components, any or all of which may be utilized as appropriate. As previously noted, mobile device 210 may vary in form and function, and may ultimately comprise any GNSS-enabled device, including phones, vehicles, commercial devices, consumer electronic devices, survey equipment, and more. Thus, in some instances, components illustrated by FIG. 8 can be localized to a single physical device and/or distributed among various networked devices, which may be disposed at different physical locations (e.g., different locations of a vehicle). It can be further noted that base/reference stations (such as, for example, the base station 220 shown in FIG. 2 and the GNSS receiver 615 shown in FIG. 6) may utilize hardware and/or software components similar to the mobile device 210. The hardware in the base/reference stations can include one or more receiver antennas that operate in the manner described herein with respect to the mobile device 210.

The mobile device 210 is shown comprising hardware elements that can be electrically coupled via a bus 830 (or may otherwise be in communication, as appropriate). The hardware elements may include a processor(s) 805 which can include without limitation one or more general-purpose processors, one or more special-purpose processors (such as DSP chips, graphics processors (GPUs), application specific integrated circuits (ASICs), and/or the like), and/or other processor, processing structure, processing unit, or processing means. As shown in FIG. 8, some embodiments may have a separate DSP 815, depending on desired functionality. Location determination and/or other determinations based on wireless communication may be provided in the processor(s) 805 and/or via a wireless communication interface 820 (discussed below). The mobile device 210 also can include one or more input devices 840, which can include without limitation a keyboard, touch screen, a touch pad, microphone, button(s), dial(s), switch(es), and/or the like; and one or more output devices 845, which can include without limitation a display, light emitting diode (LED), speakers, and/or the like. As will be appreciated, the type of input devices 840 and output devices 845 may depend on the type of mobile device 210 with which the input devices 840 and output devices 845 are integrated.

The mobile device 210 may also include a wireless communication interface 820, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, a Wide Area Network (WAN) device and/or various cellular devices, etc.), and/or the like, which may enable the mobile device 210 to communicate via networks and/or directly with other devices as described herein. The wireless communication interface 820 may permit data and signaling to be communicated (e.g. transmitted and received) with a network, for example, via WAN access points, cellular base stations and/or other access node types, and/or other network components, computer systems, and/or any other electronic devices described herein. The communication can be carried out via one or more wireless communication antenna(s) 825 that send and/or receive wireless signals 826. The wireless communication antenna(s) 825 may comprise one or more discrete antennas, one or more antenna arrays, or any combination.

Depending on desired functionality, the wireless communication interface 820 may comprise separate transceivers, a separate receiver and transmitter, or any combination of transceivers, transmitters, and/or receivers to communicate with base stations and other terrestrial transceivers, such as wireless devices and access points. The mobile device 210 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX™ (IEEE 802.16) network, and so on. A CDMA network may implement one or more radio access technologies (RATs) such as CDMA2000®, Wideband CDMA (WCDMA), and so on. CDMA2000® includes IS-95, IS-2000, and/or IS-856 standards. A TDMA network may implement Global System for Mobile Communications (GSM), Digital Advanced Mobile Phone System (D-AMPS), or some other RAT. An OFDMA network may employ Long-Term Evolution (LTE), LTE Advanced, 5G NR, 6G, and so on. 5G NR, LTE, LTE Advanced, GSM, and WCDMA are described in documents from the Third Generation Partnership Project (3GPP™). CDMA2000® is described in documents from a consortium named "3rd Generation Partnership Project 2" (3GPP2). 3GPP™ and 3GPP2 documents are publicly available. A wireless local area network (WLAN) may also be an IEEE 802.11x network, and a wireless personal area network (WPAN) may be a Bluetooth® network, an IEEE 802.15x, or some other type of network. The techniques described herein may also be used for any combination of WWAN, WLAN and/or WPAN.

The mobile device 210 can further include sensor(s) 835. Sensor(s) 835 may comprise, without limitation, one or more inertial sensors (IMUs) and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the location determination described herein, in some instances.

Embodiments of the mobile device 210 may also include a GNSS receiver 850 capable of receiving signals 856 from one or more GNSS satellites (e.g., satellites 240) as described herein using a receiver antenna 855 (which could be the same as antenna 825). The GNSS receiver 850 can extract a position of the mobile device 210, using techniques described herein, from GNSS SVs of a GNSS system (e.g., SVs 140 of FIG. 3), such as GPS, GAL, Global Navigation Satellite System (GLONASS), Quasi-Zenith Satellite System (QZSS) over Japan, Indian Regional Navigational Satellite System (IRNSS) over India, Beidou Navigation Satellite System (BDS) over China, and/or the like. Moreover, the GNSS receiver 850 can be used with various augmentation systems (e.g., Satellite-based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 850 illustrated in FIG. 8 is illustrated as a component distinct from other components within a mobile device 210, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 805, DSP 815, and/or a processor within the wireless communication interface 820 (e.g., in a modem). A GNSS receiver may optionally also include a positioning engine, such as those described herein (e.g., a PPE and/or SPE, which may be implemented using one or more of a KF, Weighted Least Squares (WLS), particle filter, etc.), which can use a PPP engine (e.g., as described with regard to FIG. 3) to determine a PPE solution and/or generate RTK correction information using PPP correction information as described herein. The positioning engine may also be executed by one or more processors, such as processor(s) 805 and/or DSP 815.

The mobile device 210 may further include and/or be in communication with a memory 810. The memory 810 may comprise a machine- or computer-readable medium, which can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 810 of the mobile device 210 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 810 that are executable by the processor(s) 805 and/or DSP 815 within the mobile device 210. In an aspect, then, such code and/or instructions can be used to configure and/or adapt a general-purpose computer (or other device) to perform one or more operations in accordance with the described methods.

Figure 9:
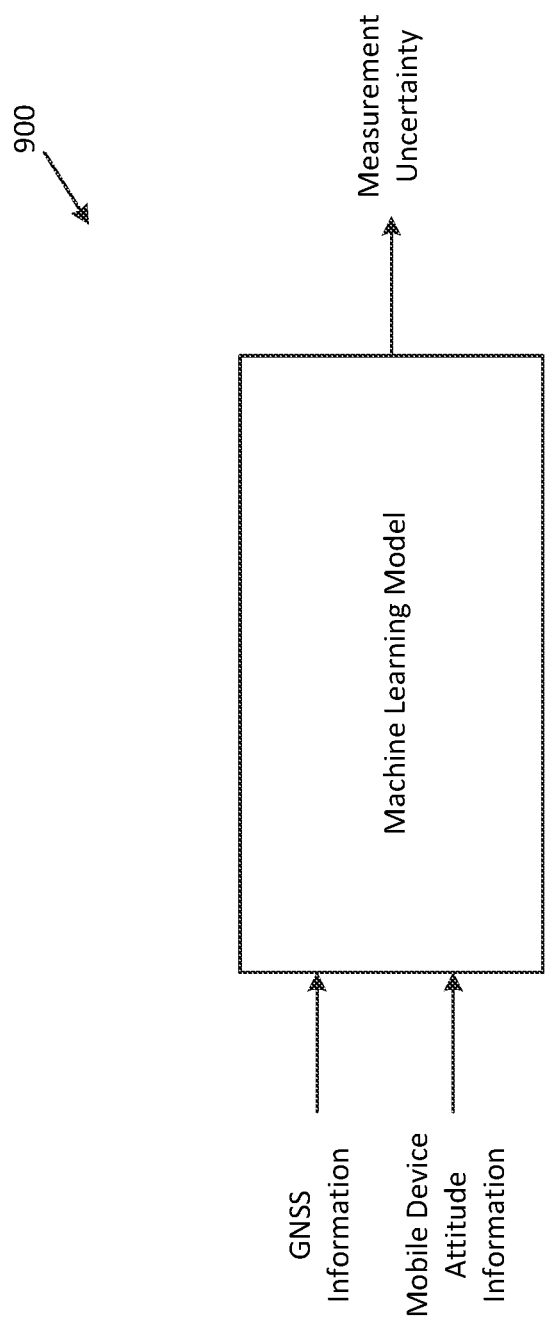
FIG. 9 illustrates a machine-learning model or antenna phase center compensation in global navigation satellite system (GNSS)-based positioning, according to an embodiment.

FIG. 9 illustrates a machine-learning model 900 for antenna phase center compensation in global navigation satellite system (GNSS)-based positioning, according to an embodiment. The machine-learning model 900 can include one or more programs that accept some types of information for training/learning purposes and subsequently offer information associated with positioning procedures that are based on antenna phase center compensation. In an embodiment, the information provided as input to the machine-learning model 900 can be GNSS information and attitude information. The GNSS information can pertain to various SVs that may be available to provide GNSS signals to a mobile device. The various SVs can be a part of systems such as, for example, GPS, Galileo, GLONASS, and BDS and the information can pertain to various types of GNSS-based positioning operations such as, for example, RTK operations, PPP operations, and DD carrier phase operations. The attitude information may be provided to the machine-learning model 900 based on sensor information obtained from one or more sensors of a mobile device at various instants in time and under various conditions or based on empirically derived values.

During a training/learning mode of operation, the machine-learning model 900 can execute the functions indicated in the flow diagram 700 and can output a measurement uncertainty prediction based on the GNSS information and attitude information provided to the machine-learning model 900. In an embodiment, the measurement uncertainty prediction may be verified, and adjustments, if needed, may be carried out upon the programs of the machine-learning model 900. Subsequently, the machine-learning model 900 can provide measurement uncertainty predictions under hitherto-unencountered use-case scenarios.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of global navigation satellite system (GNSS)-based positioning of a mobile device based on antenna phase center compensation can include determining a first phase center profile of a first receiver antenna of the mobile device that is placed in a fixed-frame condition and executing an antenna phase center compensation procedure upon detecting placement of the mobile device in a non-fixed frame condition. The antenna phase center compensation procedure can include obtaining attitude information of the mobile device based at least in part on sensor data obtained from one or more sensors of the mobile device, and incorporating the attitude information of the mobile device into the first phase center profile of the first receiver antenna of the mobile device. The method can further include executing a first global navigation satellite system-based positioning operation that includes antenna phase center compensation based at least in part on incorporating the attitude information of the mobile device into the first phase center profile of the first receiver antenna of the mobile device.

Clause 2. The method of clause 1, wherein incorporating the attitude information of the mobile device into the first phase center profile of the first receiver antenna of the mobile device comprises determining a rotation matrix based on the attitude information of the mobile device, and aligning a frame of the mobile device to an earth-centered, earth-fixed (ECEF) frame based on applying the rotation matrix to the first phase center profile.

Clause 3. The method of clause 1 or 2, wherein the first phase center profile is a phase center variation (PCV) profile of the first receiver antenna, wherein the phase center variation (PCV) profile comprises elevation parameters and azimuth parameters, and wherein executing the first global navigation satellite system-based positioning operation comprises executing a double difference (DD) carrier phase operation in the mobile device by use of the first receiver antenna, and obtaining position information of the mobile device based on applying the antenna phase center compensation upon a result of the double difference (DD) carrier phase operation.

Clause 4. The method of clause 3, wherein applying the antenna phase center compensation upon the result of the double difference (DD) carrier phase operation comprises at least one of identifying at least one of a PCV component or a PCO component in the position information, applying a correction to the position information based on identifying the at least one of the PCV component or the PCO component, or canceling at least one of a PCV residual or a PCO residual in the position information.

Clause 5. The method of clause 3, wherein applying the antenna phase center compensation upon the result of the double difference (DD) carrier phase operation comprises at least one of identifying or predicting an extent of measurement uncertainty present in a positioning estimation process due to the phase center variation (PCV) profile of the first receiver antenna, and wherein the positioning estimation process comprises an R matrix modeling in a Kalman filter operation.

Clause 6. The method of clause 1 or 2, wherein the first phase center profile is associated with at least one of a phase center variation (PCV) or a phase center offset (PCO) of the first receiver antenna, the phase center variation (PCV) comprising elevation parameters and azimuth parameters, the phase center offset (PCO) comprising elevation parameters and azimuth parameters, and wherein executing the global navigation satellite system-based positioning operation comprises executing a double difference (DD) carrier phase operation in the mobile device by use of the first receiver antenna, and obtaining position information based on applying the antenna phase center compensation upon a result of the double difference (DD) carrier phase operation.

Clause 7. The method of any of clauses 1 through 6, wherein the first receiver antenna is configured to operate at a first global navigation satellite system frequency and/or a second global navigation satellite system frequency, and wherein the mobile device includes a second receiver antenna configured to operate at a third global navigation satellite system frequency and/or a fourth global navigation satellite system frequency, the method further comprising determining a second phase center profile of the second receiver antenna of the mobile device that is placed in the fixed-frame condition, and executing the antenna phase center compensation procedure upon detecting placement of the mobile device in the non-fixed frame condition, the antenna phase center compensation procedure comprising incorporating the attitude information of the mobile device into the second phase center profile of the second receiver antenna of the mobile device, and executing a second global navigation satellite system-based positioning operation that includes antenna phase center compensation based at least in part on incorporating the attitude information of the mobile device into the second phase center profile of the second receiver antenna of the mobile device.

Clause 8. The method of clause 7, wherein obtaining attitude information of the mobile device comprises determining a first attitude of the first receiver antenna and a second attitude of the second receiver antenna.

Clause 9. The method of clause 7 or 8, wherein the mobile device is a phone and wherein the first attitude of the first receiver antenna is different than the second attitude of the second receiver antenna.

Clause 10. The method of clause 7 through 9, wherein the phone is one of a flip-phone or a folding phone, and wherein the first receiver antenna is placeable at a variable separation distance with respect to the second receiver antenna.

Clause 11. An apparatus for global navigation satellite system (GNSS)-based positioning of a mobile device based on antenna phase center compensation can include a global navigation satellite system (GNSS) receiver that includes at least a first receiver antenna, a memory, and one or more processors communicatively coupled with the GNSS receiver and the memory. The one or more processors are configured to determine a first phase center profile of the first receiver antenna of the mobile device that is placed in a fixed-frame condition, and execute an antenna phase center compensation procedure upon detecting placement of the mobile device in a non-fixed frame condition. The antenna phase center compensation procedure can include obtaining attitude information of the mobile device based at least in part on sensor data obtained from one or more sensors of the mobile device, and incorporating the attitude information of the mobile device into the first phase center profile of the first receiver antenna of the mobile device. The one or more processors are further configured to execute a first global navigation satellite system-based positioning operation that includes antenna phase center compensation based at least in part on incorporating the attitude information of the mobile device into the first phase center profile of the first receiver antenna of the mobile device.

Clause 12. The apparatus of clause 11, wherein the first phase center profile is a phase center variation (PCV) profile of the first receiver antenna, wherein the phase center variation (PCV) profile comprises elevation parameters and azimuth parameters, and wherein the one or more processors are further configured to execute the global navigation satellite system-based positioning operation based on at least executing a double difference (DD) carrier phase operation in the mobile device by use of the first receiver antenna, and obtaining position information of the mobile device based on applying the antenna phase center compensation upon a result of the double difference (DD) carrier phase operation.

Clause 13. The apparatus of clause 12, wherein applying the antenna phase center compensation upon the result of the double difference (DD) carrier phase operation comprises at least one of identifying at least one of a PCV component or a PCO component in the position information, applying a correction to the position information based on identifying the at least one of the PCV component or the PCO component, or canceling at least one of a PCV residual or a PCO residual in the position information.

Clause 14. The apparatus of clause 12, wherein applying the antenna phase center compensation upon the result of the double difference (DD) carrier phase operation comprises at least one of identifying or predicting an extent of measurement uncertainty present in a positioning estimation process due to the phase center variation (PCV) profile of the first receiver antenna, and wherein the positioning estimation process comprises an R matrix modeling in a Kalman filter operation.

Clause 15. The apparatus of clause 11, wherein the first phase center profile is associated with at least one of a phase center variation (PCV) or a phase center offset (PCO) of the first receiver antenna, the phase center variation (PCV) comprising elevation parameters and azimuth parameters, the phase center offset (PCO) comprising elevation parameters and azimuth parameters, and wherein the one or more processors are further configured to execute the global navigation satellite system-based positioning operation based on at least executing a double difference (DD) carrier phase operation in the mobile device by use of the first receiver antenna, and obtaining position information based on applying the antenna phase center compensation upon a result of the double difference (DD) carrier phase operation.

Clause 16. The apparatus of any of clauses 11 through 15, wherein attitude information of the mobile device includes at least one of a roll information, a pitch information, or a heading information.

Clause 17. The apparatus of any of clauses 11 through 16, wherein the first receiver antenna is configured to operate at a first global navigation satellite system frequency and/or a second global navigation satellite system frequency, and wherein the mobile device includes a second receiver antenna configured to operate at a third global navigation satellite system frequency and/or a fourth global navigation satellite system frequency, and wherein the one or more processors are further configured to determine a second phase center profile of the second receiver antenna of the mobile device that is placed in the fixed-frame condition, and execute the antenna phase center compensation procedure upon detecting placement of the mobile device in the non-fixed frame condition. The antenna phase center compensation procedure can include incorporating the attitude information of the mobile device into the second phase center profile of the second receiver antenna of the mobile device. The one or more processors can be further configured to execute a second global navigation satellite system-based positioning operation that includes antenna phase center compensation based at least in part on incorporating the attitude information of the mobile device into the second phase center profile of the second receiver antenna of the mobile device.

Clause 18. The apparatus of clause 17, wherein obtaining attitude information of the mobile device comprises determining a first attitude of the first receiver antenna and a second attitude of the second receiver antenna.

Clause 19. The apparatus of clauses 18 or 19, wherein the mobile device is a phone and wherein the first attitude of the first receiver antenna is different than the second attitude of the second receiver antenna.

Clause 20. The apparatus of clause 19, wherein the phone is one of a flip-phone or a folding phone, and wherein the first receiver antenna is placeable at a variable separation distance with respect to the second receiver antenna.

Clause 21. A non-transitory computer-readable medium storing instructions for global navigation satellite system (GNSS)-based positioning of a mobile device based on antenna phase center compensation, the instructions comprising code for determining a first phase center profile of a first receiver antenna of the mobile device that is placed in a fixed-frame condition, and executing an antenna phase center compensation procedure upon detecting placement of the mobile device in a non-fixed frame condition. The antenna phase center compensation procedure can include obtaining attitude information of the mobile device based at least in part on sensor data obtained from one or more sensors of the mobile device, and incorporating the attitude information of the mobile device into the first phase center profile of the first receiver antenna of the mobile device. The instructions can further include code for executing a first global navigation satellite system-based positioning operation that includes antenna phase center compensation based at least in part on incorporating the attitude information of the mobile device into the first phase center profile of the first receiver antenna of the mobile device.

Clause 22. The non-transitory computer-readable medium of clause 21, wherein incorporating the attitude information of the mobile device into the first phase center profile of the first receiver antenna of the mobile device comprises determining a rotation matrix based on the attitude information of the mobile device, and aligning a frame of the mobile device to an earth-centered, earth-fixed (ECEF) frame based on applying the rotation matrix to the first phase center profile.

Clause 23. The non-transitory computer-readable medium of clause 21 or 22, wherein the first phase center profile is a phase center variation (PCV) profile of the first receiver antenna, wherein the phase center variation (PCV) profile comprises elevation parameters and azimuth parameters, and wherein executing the global navigation satellite system-based positioning operation comprises executing a double difference (DD) carrier phase operation in the mobile device by use of the first receiver antenna, and obtaining position information of the mobile device based on applying the antenna phase center compensation upon a result of the double difference (DD) carrier phase operation.

Clause 24. The non-transitory computer-readable medium of clause 23, wherein applying the antenna phase center compensation upon the result of the double difference (DD) carrier phase operation comprises at least one of identifying at least one of a PCV component or a PCO component in the position information, applying a correction to the position information based on identifying the at least one of the PCV component or the PCO component, or canceling at least one of a PCV residual or a PCO residual in the position information.

Clause 25. The non-transitory computer-readable medium of clause 23, wherein applying the antenna phase center compensation upon the result of the double difference (DD) carrier phase operation comprises at least one of identifying or predicting an extent of measurement uncertainty present in a positioning estimation process due to the phase center variation (PCV) profile of the first receiver antenna, and wherein the positioning estimation process comprises an R matrix modeling in a Kalman filter operation.

Clause 26. The non-transitory computer-readable medium of any of clause 21 or 22, wherein the first phase center profile is associated with at least one of a phase center variation (PCV) or a phase center offset (PCO) of the first receiver antenna, the phase center variation (PCV) comprising elevation parameters and azimuth parameters, the phase center offset (PCO) comprising elevation parameters and azimuth parameters, and wherein executing the global navigation satellite system-based positioning operation comprises executing a double difference (DD) carrier phase operation in the mobile device by use of the first receiver antenna, and obtaining position information based on applying the antenna phase center compensation upon a result of the double difference (DD) carrier phase operation.

Clause 27. The non-transitory computer-readable medium of any of clauses 21 through 26, wherein the first receiver antenna is configured to operate at a first global navigation satellite system frequency and/or a second global navigation satellite system frequency, and wherein the mobile device includes a second receiver antenna configured to operate at a third global navigation satellite system frequency and/or a fourth global navigation satellite system frequency, the antenna phase center compensation procedure further comprising determining a second phase center profile of the second receiver antenna of the mobile device that is placed in the fixed-frame condition, and executing the antenna phase center compensation procedure upon detecting placement of the mobile device in the non-fixed frame condition, the antenna phase center compensation procedure comprising incorporating the attitude information of the mobile device into the second phase center profile of the second receiver antenna of the mobile device, and executing a second global navigation satellite system-based positioning operation that includes antenna phase center compensation based at least in part on incorporating the attitude information of the mobile device into the second phase center profile of the second receiver antenna of the mobile device.

Clause 28. An apparatus for global navigation satellite system (GNSS)-based positioning of a mobile device based on antenna phase center compensation, the apparatus comprising means for determining a first phase center profile of a first receiver antenna of the mobile device that is placed in a fixed-frame condition and means for executing an antenna phase center compensation procedure upon detecting placement of the mobile device in a non-fixed frame condition. The antenna phase center compensation procedure can include obtaining attitude information of the mobile device based at least in part on sensor data obtained from one or more sensors of the mobile device, and incorporating the attitude information of the mobile device into the first phase center profile of the first receiver antenna of the mobile device. The apparatus can further include means for executing a first global navigation satellite system-based positioning operation that includes antenna phase center compensation based at least in part on incorporating the attitude information of the mobile device into the first phase center profile of the first receiver antenna of the mobile device.

Clause 29. The apparatus of clause 28, wherein the first phase center profile is a phase center variation (PCV) profile of the first receiver antenna, wherein the phase center variation (PCV) profile comprises elevation parameters and azimuth parameters, and wherein means for executing the global navigation satellite system (GNSS)-based positioning operation comprises means for executing a double difference (DD) carrier phase operation in the mobile device by use of the first receiver antenna, and means for obtaining position information of the mobile device based on applying the antenna phase center compensation upon a result of the double difference (DD) carrier phase operation.

Clause 30. The apparatus of clause 29, wherein applying the antenna phase center compensation upon the result of the double difference (DD) carrier phase operation comprises at least one of identifying at least one of a PCV component or a PCO component in the position information, applying a correction to the position information based on identifying the at least one of the PCV component or the PCO component, or canceling at least one of a PCV residual or a PCO residual in the position information.

What is claimed is:

1. A method of global navigation satellite system (GNSS)-based positioning of a mobile device based on antenna phase center compensation, the method comprising:
   determining a first phase center profile of a first receiver antenna of the mobile device that is placed in a fixed-frame condition; and
   executing an antenna phase center compensation procedure upon detecting placement of the mobile device in a non-fixed frame condition, the antenna phase center compensation procedure comprising:
      obtaining attitude information of the mobile device based at least in part on sensor data obtained from one or more sensors of the mobile device; and
      incorporating the attitude information of the mobile device into the first phase center profile of the first receiver antenna of the mobile device; and
   executing a first global navigation satellite system-based positioning operation that includes antenna phase center compensation based at least in part on incorporating the attitude information of the mobile device into the first phase center profile of the first receiver antenna of the mobile device.

2. The method of claim 1, wherein incorporating the attitude information of the mobile device into the first phase center profile of the first receiver antenna of the mobile device comprises:
   determining a rotation matrix based on the attitude information of the mobile device; and
   aligning a frame of the mobile device to an earth-centered, earth-fixed (ECEF) frame based on applying the rotation matrix to the first phase center profile.

3. The method of claim 1, wherein the first phase center profile is a phase center variation (PCV) profile of the first receiver antenna, wherein the phase center variation (PCV) profile comprises elevation parameters and azimuth parameters, and wherein executing the first global navigation satellite system-based positioning operation comprises:
   executing a double difference (DD) carrier phase operation in the mobile device by use of the first receiver antenna; and
   obtaining position information of the mobile device based on applying the antenna phase center compensation upon a result of the double difference (DD) carrier phase operation.

4. The method of claim 3, wherein applying the antenna phase center compensation upon the result of the double difference (DD) carrier phase operation comprises at least one of identifying at least one of a PCV component or a PCO component in the position information, applying a correction to the position information based on identifying the at least one of the PCV component or the PCO component, or canceling at least one of a PCV residual or a PCO residual in the position information.

5. The method of claim 3, wherein applying the antenna phase center compensation upon the result of the double difference (DD) carrier phase operation comprises at least one of identifying or predicting an extent of measurement uncertainty present in a positioning estimation process due to the phase center variation (PCV) profile of the first receiver antenna, and wherein the positioning estimation process comprises an R matrix modeling in a Kalman filter operation.

6. The method of claim 1, wherein the first phase center profile is associated with at least one of a phase center variation (PCV) or a phase center offset (PCO) of the first receiver antenna, the phase center variation (PCV) comprising elevation parameters and azimuth parameters, the phase center offset (PCO) comprising elevation parameters and azimuth parameters, and wherein executing the global navigation satellite system-based positioning operation comprises:
   executing a double difference (DD) carrier phase operation in the mobile device by use of the first receiver antenna; and
   obtaining position information based on applying the antenna phase center compensation upon a result of the double difference (DD) carrier phase operation.

7. The method of claim 1, wherein the first receiver antenna is configured to operate at a first global navigation satellite system frequency and/or a second global navigation satellite system frequency, and wherein the mobile device includes a second receiver antenna configured to operate at a third global navigation satellite system frequency and/or a fourth global navigation satellite system frequency, the method further comprising:
   determining a second phase center profile of the second receiver antenna of the mobile device that is placed in the fixed-frame condition; and
   executing the antenna phase center compensation procedure upon detecting placement of the mobile device in the non-fixed frame condition, the antenna phase center compensation procedure comprising:
      incorporating the attitude information of the mobile device into the second phase center profile of the second receiver antenna of the mobile device; and
   executing a second global navigation satellite system-based positioning operation that includes antenna phase center compensation based at least in part on incorporating the attitude information of the mobile device into the second phase center profile of the second receiver antenna of the mobile device.

8. The method of claim 7, wherein obtaining attitude information of the mobile device comprises determining a first attitude of the first receiver antenna and a second attitude of the second receiver antenna.

9. The method of claim 8, wherein the mobile device is a phone and wherein the first attitude of the first receiver antenna is different than the second attitude of the second receiver antenna.

10. The method of claim 9, wherein the phone is one of a flip-phone or a folding phone, and wherein the first receiver antenna is placeable at a variable separation distance with respect to the second receiver antenna.

11. An apparatus for global navigation satellite system (GNSS)-based positioning of a mobile device based on antenna phase center compensation, comprising:
   a global navigation satellite system (GNSS) receiver that includes at least a first receiver antenna;
   a memory; and
   one or more processors communicatively coupled with the GNSS receiver and the memory, wherein the one or more processors are configured to:
      determine a first phase center profile of a first receiver antenna of the mobile device that is placed in a fixed-frame condition; and
      execute an antenna phase center compensation procedure upon detecting placement of the mobile device in a non-fixed frame condition, the antenna phase center compensation procedure comprising:
         obtaining attitude information of the mobile device based at least in part on sensor data obtained from one or more sensors of the mobile device; and
         incorporating the attitude information of the mobile device into the first phase center profile of the first receiver antenna of the mobile device; and
      execute a first global navigation satellite system-based positioning operation that includes antenna phase center compensation based at least in part on incorporating the attitude information of the mobile device into the first phase center profile of the first receiver antenna of the mobile device.

12. The apparatus of claim 11, wherein the first phase center profile is a phase center variation (PCV) profile of the first receiver antenna, wherein the phase center variation (PCV) profile comprises elevation parameters and azimuth parameters, and wherein the one or more processors are further configured to execute the global navigation satellite system-based positioning operation based on at least:
   executing a double difference (DD) carrier phase operation in the mobile device by use of the first receiver antenna; and
   obtaining position information of the mobile device based on applying the antenna phase center compensation upon a result of the double difference (DD) carrier phase operation.

13. The apparatus of claim 12, wherein applying the antenna phase center compensation upon the result of the double difference (DD) carrier phase operation comprises at least one of identifying at least one of a PCV component or a PCO component in the position information, applying a correction to the position information based on identifying the at least one of the PCV component or the PCO component, or canceling at least one of a PCV residual or a PCO residual in the position information.

14. The apparatus of claim 12, wherein applying the antenna phase center compensation upon the result of the double difference (DD) carrier phase operation comprises at least one of identifying or predicting an extent of measurement uncertainty present in a positioning estimation process due to the phase center variation (PCV) profile of the first receiver antenna, and wherein the positioning estimation process comprises an R matrix modeling in a Kalman filter operation.

15. The apparatus of claim 11, wherein the first phase center profile is associated with at least one of a phase center variation (PCV) or a phase center offset (PCO) of the first receiver antenna, the phase center variation (PCV) comprising elevation parameters and azimuth parameters, the phase center offset (PCO) comprising elevation parameters and azimuth parameters, and wherein the one or more processors are further configured to execute the first global navigation satellite system-based positioning operation based on at least:
   executing a double difference (DD) carrier phase operation in the mobile device by use of the first receiver antenna; and
   obtaining position information based on applying the antenna phase center compensation upon a result of the double difference (DD) carrier phase operation.

16. The apparatus of claim 11, wherein attitude information of the mobile device includes at least one of a roll information, a pitch information, or a heading information.

17. The apparatus of claim 11, wherein the first receiver antenna is configured to operate at a first global navigation satellite system frequency and/or a second global navigation satellite system frequency, and wherein the mobile device includes a second receiver antenna configured to operate at a third global navigation satellite system frequency and/or a fourth global navigation satellite system frequency, and wherein the one or more processors are further configured to:
   determine a second phase center profile of the second receiver antenna of the mobile device that is placed in the fixed-frame condition; and
   execute the antenna phase center compensation procedure upon detecting placement of the mobile device in the non-fixed frame condition, the antenna phase center compensation procedure comprising:
      incorporating the attitude information of the mobile device into the second phase center profile of the second receiver antenna of the mobile device; and
   execute a second global navigation satellite system-based positioning operation that includes antenna phase center compensation based at least in part on incorporating the attitude information of the mobile device into the second phase center profile of the second receiver antenna of the mobile device.

18. The apparatus of claim 17, wherein obtaining attitude information of the mobile device comprises determining a first attitude of the first receiver antenna and a second attitude of the second receiver antenna.

19. The apparatus of claim 18, wherein the mobile device is a phone and wherein the first attitude of the first receiver antenna is different than the second attitude of the second receiver antenna.

20. The apparatus of claim 19, wherein the phone is one of a flip-phone or a folding phone, and wherein the first receiver antenna is placeable at a variable separation distance with respect to the second receiver antenna.

21. A non-transitory computer-readable medium storing instructions for global navigation satellite system (GNSS)-based positioning of a mobile device based on antenna phase center compensation, the instructions comprising code for:
   determining a first phase center profile of a first receiver antenna of the mobile device that is placed in a fixed-frame condition; and
   executing an antenna phase center compensation procedure upon detecting placement of the mobile device in a non-fixed frame condition, the antenna phase center compensation procedure comprising:
      obtaining attitude information of the mobile device based at least in part on sensor data obtained from one or more sensors of the mobile device; and
      incorporating the attitude information of the mobile device into the first phase center profile of the first receiver antenna of the mobile device; and
   executing a first global navigation satellite system-based positioning operation that includes antenna phase center compensation based at least in part on incorporating the attitude information of the mobile device into the first phase center profile of the first receiver antenna of the mobile device.

22. The non-transitory computer-readable medium of claim 21, wherein incorporating the attitude information of the mobile device into the first phase center profile of the first receiver antenna of the mobile device comprises:
   determining a rotation matrix based on the attitude information of the mobile device; and
   aligning a frame of the mobile device to an earth-centered, earth-fixed (ECEF) frame based on applying the rotation matrix to the first phase center profile.

23. The non-transitory computer-readable medium of claim 21, wherein the first phase center profile is a phase center variation (PCV) profile of the first receiver antenna, wherein the phase center variation (PCV) profile comprises elevation parameters and azimuth parameters, and wherein executing the global navigation satellite system-based positioning operation comprises:
   executing a double difference (DD) carrier phase operation in the mobile device by use of the first receiver antenna; and
   obtaining position information of the mobile device based on applying the antenna phase center compensation upon a result of the double difference (DD) carrier phase operation.

24. The non-transitory computer-readable medium of claim 23, wherein applying the antenna phase center compensation upon the result of the double difference (DD) carrier phase operation comprises at least one of identifying at least one of a PCV component or a PCO component in the position information, applying a correction to the position information based on identifying the at least one of the PCV component or the PCO component, or canceling at least one of a PCV residual or a PCO residual in the position information.

25. The non-transitory computer-readable medium of claim 23, wherein applying the antenna phase center compensation upon the result of the double difference (DD)

carrier phase operation comprises at least one of identifying or predicting an extent of measurement uncertainty present in a positioning estimation process due to the phase center variation (PCV) profile of the first receiver antenna, and wherein the positioning estimation process comprises an R matrix modeling in a Kalman filter operation.

26. The non-transitory computer-readable medium of claim 21, wherein the first phase center profile is associated with at least one of a phase center variation (PCV) or a phase center offset (PCO) of the first receiver antenna, the phase center variation (PCV) comprising elevation parameters and azimuth parameters, the phase center offset (PCO) comprising elevation parameters and azimuth parameters, and wherein executing the global navigation satellite system-based positioning operation comprises:
 executing a double difference (DD) carrier phase operation in the mobile device by use of the first receiver antenna; and
 obtaining position information based on applying the antenna phase center compensation upon a result of the double difference (DD) carrier phase operation.

27. The non-transitory computer-readable medium of claim 21, wherein the first receiver antenna is configured to operate at a first global navigation satellite system frequency and/or a second global navigation satellite system frequency, and wherein the mobile device includes a second receiver antenna configured to operate at a third global navigation satellite system frequency and/or a fourth global navigation satellite system frequency, the antenna phase center compensation procedure further comprising:
 determining a second phase center profile of the second receiver antenna of the mobile device that is placed in the fixed-frame condition; and
 executing the antenna phase center compensation procedure upon detecting placement of the mobile device in the non-fixed frame condition, the antenna phase center compensation procedure comprising:
  incorporating the attitude information of the mobile device into the second phase center profile of the second receiver antenna of the mobile device; and
  executing a second global navigation satellite system-based positioning operation that includes antenna phase center compensation based at least in part on incorporating the attitude information of the mobile device into the second phase center profile of the second receiver antenna of the mobile device.

28. An apparatus for global navigation satellite system (GNSS)-based positioning of a mobile device based on antenna phase center compensation, the apparatus comprising:
 means for determining a first phase center profile of a first receiver antenna of the mobile device that is placed in a fixed-frame condition; and
 means for executing an antenna phase center compensation procedure upon detecting placement of the mobile device in a non-fixed frame condition, the antenna phase center compensation procedure comprising:
  obtaining attitude information of the mobile device based at least in part on sensor data obtained from one or more sensors of the mobile device; and
  incorporating the attitude information of the mobile device into the first phase center profile of the first receiver antenna of the mobile device; and
 means for executing a first global navigation satellite system-based positioning operation that includes antenna phase center compensation based at least in part on incorporating the attitude information of the mobile device into the first phase center profile of the first receiver antenna of the mobile device.

29. The apparatus of claim 28, wherein the first phase center profile is a phase center variation (PCV) profile of the first receiver antenna, wherein the phase center variation (PCV) profile comprises elevation parameters and azimuth parameters, and wherein means for executing the global navigation satellite system (GNSS)-based positioning operation comprises:
 means for executing a double difference (DD) carrier phase operation in the mobile device by use of the first receiver antenna; and
 means for obtaining position information of the mobile device based on applying the antenna phase center compensation upon a result of the double difference (DD) carrier phase operation.

30. The apparatus of claim 29, wherein applying the antenna phase center compensation upon the result of the double difference (DD) carrier phase operation comprises at least one of identifying at least one of a PCV component or a PCO component in the position information, applying a correction to the position information based on identifying the at least one of the PCV component or the PCO component, or canceling at least one of a PCV residual or a PCO residual in the position information.

* * * * *